(12) United States Patent
Fattal

(10) Patent No.: US 11,686,898 B2
(45) Date of Patent: Jun. 27, 2023

(54) PRIVACY DISPLAY AND DUAL-MODE PRIVACY DISPLAY SYSTEM

(71) Applicant: LEIA INC., Menlo Park, CA (US)

(72) Inventor: David A. Fattal, Mountain View, CA (US)

(73) Assignee: LEIA INC., Menlo Park, CA (US)

( * ) Notice: Subject to any disclaimer, the term of this patent is extended or adjusted under 35 U.S.C. 154(b) by 167 days.

(21) Appl. No.: 17/169,369

(22) Filed: Feb. 5, 2021

(65) Prior Publication Data

US 2021/0157050 A1 May 27, 2021

Related U.S. Application Data

(63) Continuation of application No. 16/066,292, filed as application No. PCT/US2016/043939 on Jul. 25, (Continued)

(51) Int. Cl.
*G02B 6/12* (2006.01)
*G02F 1/13357* (2006.01)
(Continued)

(52) U.S. Cl.
CPC ............ *G02B 6/12* (2013.01); *G02B 5/1842* (2013.01); *G02B 6/0035* (2013.01);
(Continued)

(58) Field of Classification Search
CPC .... G02B 6/005; G02B 6/0035; G02B 6/0038; G02B 6/0058; G02B 6/12; G02B 5/18;
(Continued)

(56) References Cited

U.S. PATENT DOCUMENTS 5,617,248 A 4/1997 Takahashi et al.
6,967,698 B2 11/2005 Tanoue et al.
(Continued)

FOREIGN PATENT DOCUMENTS

CN 1987606 A 6/2007
GB 2428152 A 1/2007
(Continued)

OTHER PUBLICATIONS

International Search Report (ISR) and Written Opinion (WO) from the International Searching Authority (ISA/KR) dated Oct. 21, 2016 (12 pages) for counterpart parent PCT Application No. PCT/US2016/043939.

(Continued)

*Primary Examiner* — Jie Lei
(74) *Attorney, Agent, or Firm* — J. Michael Johnson

(57) ABSTRACT

A privacy display provides a private image exclusively visible within a viewing cone of a viewbox. The privacy display includes a light guide to guide light, a diffraction grating configured to diffractively couple out a portion of the guided light as diffractively coupled-out light and to direct the diffractively coupled-out light into the viewbox, and a light valve array configured to modulate the diffractively coupled-out light to provide the private image. An extent of the viewbox is determined by a collimation factor of the guided light. A dual-mode privacy display system further includes a broad-angle backlight configured to provide broad-angle light to separately provide a public image visible both inside and outside the viewing cone. The private image may be provided in a privacy mode and the public image may be provided in a public mode of the dual-mode privacy display system.

20 Claims, 9 Drawing Sheets

Related U.S. Application Data 2016, now abandoned, and a continuation of application No. PCT/US2016/040904, filed on Jul. 2, 2016, which is a continuation of application No. PCT/US2016/040582, filed on Jun. 30, 2016.

(60) Provisional application No. 62/289,238, filed on Jan. 30, 2016.

(51) Int. Cl.
*F21V 8/00* (2006.01)
*G02B 5/18* (2006.01)
*G02B 27/42* (2006.01)
*G02F 1/1335* (2006.01)

(52) U.S. Cl.
CPC ........... *G02B 6/0038* (2013.01); *G02B 27/42* (2013.01); *G02F 1/1336* (2013.01); *G02F 1/133602* (2013.01); *G02F 1/133626* (2021.01)

(58) Field of Classification Search
CPC .. G02B 5/1842; G02B 5/1861; G02B 5/1866; G02B 27/42; G02B 27/22; G02B 27/2214; G02B 27/0172; G02F 1/1335; G02F 1/133602; G02F 1/133615; G02F 1/1336; G02F 1/133626
USPC ...... 359/566, 567, 569, 563; 349/15, 61, 65, 349/142; 345/38, 84, 402
See application file for complete search history.

(56) References Cited

U.S. PATENT DOCUMENTS

| | | | |
|---|---|---|---|
| 7,692,733 B2 | 4/2010 | Daiku | |
| 8,810,750 B2 | 8/2014 | Mun et al. | |
| 9,128,226 B2 | 9/2015 | Fattal et al. | |
| 9,188,731 B2 | 11/2015 | Woodgate | |
| 9,201,270 B2 | 12/2015 | Fattal et al. | |
| 9,298,168 B2 | 3/2016 | Taff et al. | |
| 9,389,415 B2 | 7/2016 | Fattal et al. | |
| 9,459,461 B2 | 10/2016 | Santori et al. | |
| 9,557,466 B2 | 1/2017 | Fattal | |
| 9,594,261 B2 | 3/2017 | Woodgate et al. | |
| 9,740,034 B2 | 8/2017 | Woodgate et al. | |
| 9,785,119 B2 | 10/2017 | Taff et al. | |
| 10,698,217 B2 | 6/2020 | Fattal | |
| 10,728,533 B2 | 7/2020 | Fattal | |
| 11,048,085 B2 * | 6/2021 | Fattal | G02B 6/0036 |
| 2003/0067685 A1 | 4/2003 | Niv | |
| 2005/0007757 A1 | 1/2005 | Leu et al. | |
| 2007/0040780 A1 | 2/2007 | Gass et al. | |
| 2007/0070504 A1 | 3/2007 | Akutsu et al. | |
| 2007/0076434 A1 | 4/2007 | Uehara et al. | |
| 2007/0242237 A1 | 10/2007 | Thomas | |
| 2009/0067156 A1 | 3/2009 | Bonnett et al. | |
| 2009/0213300 A1 | 8/2009 | Daiku | |
| 2010/0177388 A1 | 7/2010 | Cohen et al. | |
| 2010/0309688 A1 | 12/2010 | Montgomery et al. | |
| 2011/0157667 A1 | 6/2011 | Lacoste et al. | |
| 2012/0056914 A1 | 3/2012 | Gass et al. | |
| 2012/0119978 A1 | 5/2012 | Border et al. | |
| 2012/0162549 A1 | 6/2012 | Gao et al. | |
| 2014/0064655 A1 | 3/2014 | Nguyen et al. | |
| 2014/0071539 A1 | 3/2014 | Gao | |
| 2014/0104685 A1 | 4/2014 | Bohn et al. | |
| 2014/0268867 A1 | 9/2014 | Fiorentino et al. | |
| 2014/0286044 A1 | 9/2014 | Johnson et al. | |
| 2014/0333517 A1 | 11/2014 | Travis | |
| 2015/0036068 A1 | 2/2015 | Fattal et al. | |
| 2015/0234205 A1 | 8/2015 | Schowengerdt | |
| 2016/0033706 A1 | 2/2016 | Fattal et al. | |
| 2016/0195664 A1 | 7/2016 | Fattal et al. | |
| 2017/0090096 A1 | 3/2017 | Fattal | |
| 2018/0246330 A1 | 8/2018 | Fattal | |
| 2019/0170926 A1 | 6/2019 | Fattal et al. | |

FOREIGN PATENT DOCUMENTS

| | | |
|---|---|---|
| JP | 2006114379 A | 4/2006 |
| JP | 2008300206 A | 12/2008 |
| KR | 20120005765 A | 1/2012 |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Huang, Fu-Chung, et al., "The Light Field Steroscope—Immersive Computer Graphics via Factored Near-Eye Field Displays with Focus Cues," SIGGRAPH 2015, 12 pages, Stanford Computational Imaging Lab, computationalimagaing.org.

Lanman, Douglas, et al., "Near-Eye Light Field Displays," ACM Transactions on Graphics (TOG)—Proceedings of ACM—SIGGRAPH Asia, Nov. 2013, 10 pages, vol. 32, Issue 6, Article No. 220.

Hua, Hong, et al., "A 3D integral imaging optical see-through head-mounted display," Optics Express, Jun. 2, 2014, pp. 13484-13491, vol. 22, No. 11, Copyright OSA 2014.

Cheng, Dewen, et al., "Design of a wide-angle, lightweight head-mounted display using free-form optics tiling," Optics Letters, Jun. 1, 2011, pp. 2098-2100. vol. 36, No. 11.

Search Report (SR) from the Taiwan Intellectual Property Office (TIPO) date completed Mar. 9, 2018 (1 page English translation and 1 Pg original language document) for Taiwan counterpart patent application No. 106120745 to counterpart parent PCT application No. PCT/US2016/043939.

\* cited by examiner

PRIVACY DISPLAY AND DUAL-MODE PRIVACY DISPLAY SYSTEM

CROSS-REFERENCE TO RELATED APPLICATIONS

This application is a continuation application of and claims the benefit of priority to U.S. application Ser. No. 16/066,292, filed Jun. 26, 2018, which claims the benefit of priority to International Application No. PCT/US2016/043939, filed Jul. 25, 2016, which claims the benefit of priority to U.S. Provisional Patent Application Ser. No. 62/289,238, filed Jan. 30, 2016, International (PCT) Application No. PCT/US2016/040582, filed Jun. 30, 2016, and International (PCT) Application No. PCT/US2016/040904, filed Jul. 2, 2016, all of which are incorporated by reference in their entireties herein.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Figure 1A:
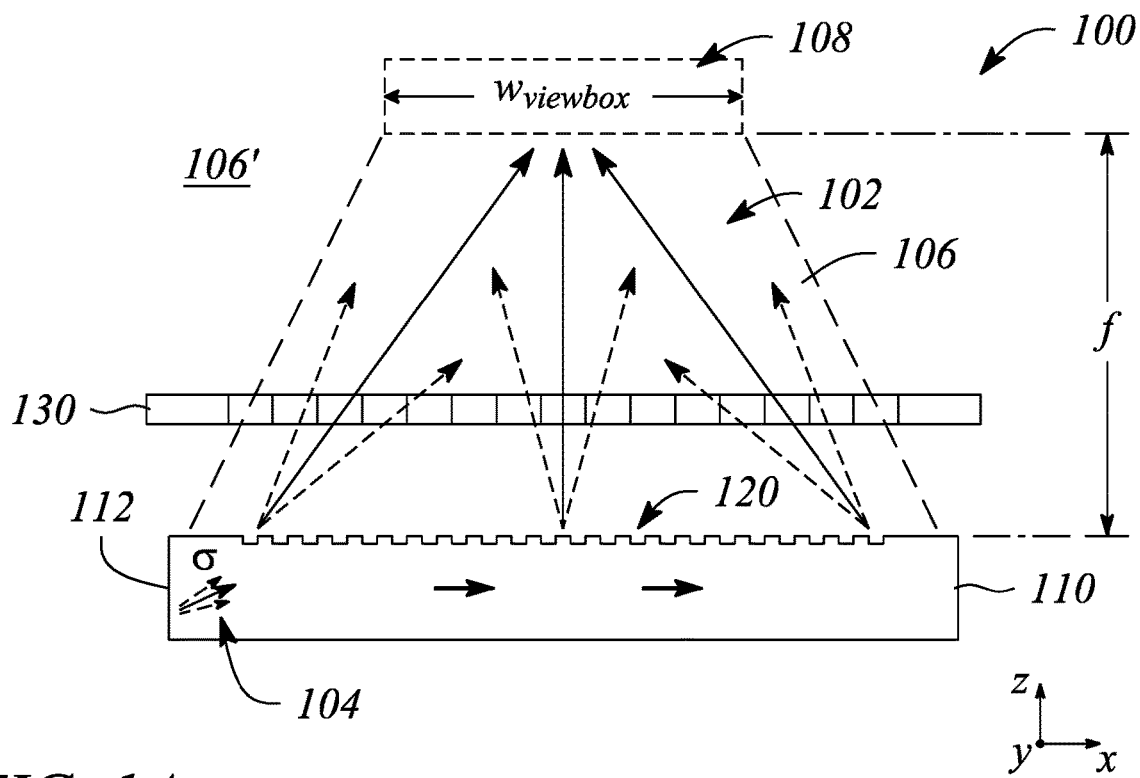
FIG. 1A illustrates a side view of a privacy display in an example, according to an embodiment consistent with the principles described herein.

Certain examples and embodiments may have other features that are one of in addition to and in lieu of the features illustrated in the above-referenced figures. These and other features are detailed below with reference to the above-referenced figures.

DETAILED DESCRIPTION

Embodiments in accordance with the principles described herein provide a privacy display with application to electronic display systems. According to various embodiments, the privacy display employs a diffraction grating configured to diffractively couple light out of a light guide. Further, the diffraction grating is configured to direct the diffractively coupled-out light within a viewing cone and into a viewbox. According to various embodiments, the privacy display may be used in an electronic display system to provide privacy viewing (e.g., in a privacy mode). In addition, a dual-mode privacy display system may provide both of a public mode for general viewing and a privacy mode that provides private viewing by a user, according to some embodiments.

Herein, a 'diffraction grating' is generally defined as a plurality of features arranged to provide diffraction of light incident on the diffraction grating. In some examples, the plurality of features may be arranged in a periodic or quasi-periodic manner. For example, the diffraction grating may include a plurality of features (e.g., a plurality of grooves or ridges in a material surface) arranged in a one-dimensional (1D) array. In other examples, the diffraction grating may be a two-dimensional (2D) array of features. The diffraction grating may be a 2D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by or according to diffraction. The diffraction grating also redirects or changes an angle of the light by diffraction (i.e., at a diffractive angle). In particular, as a result of diffraction, light leaving the diffraction grating by diffractive coupling generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from the light guide.

Further, by definition herein, the features of a diffraction grating are referred to as 'diffractive features' and may be one or more of at, in and on a material surface (i.e., a boundary between two materials). The surface may be a surface of a light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

A 'reflection mode' or 'reflective' diffraction grating is defined herein as a diffraction grating that both diffracts and reflects incident light. Similarly, 'reflection mode diffraction' is defined as diffraction in a direction corresponding to a light-incident side (e.g., of a reflection mode diffraction grating). As such, light diffractively scattered by a reflection mode diffraction grating generally exits or propagates away from a side of the reflection mode diffraction grating that is the same as the side that the light is incident on the reflection mode diffraction grating (i.e., a 'light-incident side'). By contrast, a 'transmission mode' or 'transmissive' diffraction grating is defined herein as a diffraction grating that diffracts light passing through the diffraction grating such that diffracted light generally exits from a side of a transmission mode diffraction grating that is opposite to the light-incident side. In some examples, a reflection mode diffraction grating may comprise a reflective material or material layer (e.g., a reflective metal) that reflects or at least partially reflects incident light. The diffractive features of the reflection mode diffraction grating (e.g., ridges or grooves) may be one or more of formed in a surface of the reflective material and formed on or adjacent to the reflective material surface, according to various embodiments.

Herein, 'viewbox' is defined as a region or volume of space in which an image formed by a display or other optical system (e.g., lens system) is visible and thus may be viewed. In other words, the viewbox defines a location or region in space within which a user's eyes may be placed in order to view an image produced by the display or display system. Moreover, the viewbox is generally large enough to accommodate both of a user's eyes. In some embodiments, the viewbox may represent a two dimensional region of space (e.g., a region with length and width but without substantial depth), while in other embodiments, the viewbox may include a three-dimensional region of space (e.g., a region with length, width and depth). Further, while referred to as a 'box', the viewbox may not be restricted to a box that is polygonal or rectangular in shape. For example, the viewbox may comprise a cylindrical region of space, in some embodiments. In other examples, the region of space may have various other shapes including, but not limited to, an elliptical cylinder, a hyperbolic cylinder and a general ellipsoid.

Herein, a 'collimation factor,' denoted a, is defined as a degree to which light is collimated. In particular, a collimation factor defines an angular spread of light rays within a collimated beam of light, by definition herein. For example, a collimation factor σ may specify that a majority of light rays in a beam of collimated light is within a particular angular spread (e.g., +/−σ degrees about a central or principal angular direction of the collimated light beam). The light rays of the collimated light beam may have a Gaussian distribution in terms of angle and the angular spread may be an angle determined at one-half of a peak intensity of the collimated light beam, according to some examples.

As used herein, the article 'a' is intended to have its ordinary meaning in the patent arts, namely 'one or more'. For example, 'a grating' means one or more gratings and as such, 'the grating' means 'the grating(s)' herein. Also, any reference herein to 'top', 'bottom', 'upper', 'lower', 'up', 'down', 'front', 'back', 'first', 'second', 'left' or 'right' is not intended to be a limitation herein. Herein, the term 'about' when applied to a value generally means within the tolerance range of the equipment used to produce the value, or in some embodiments, may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 1B:
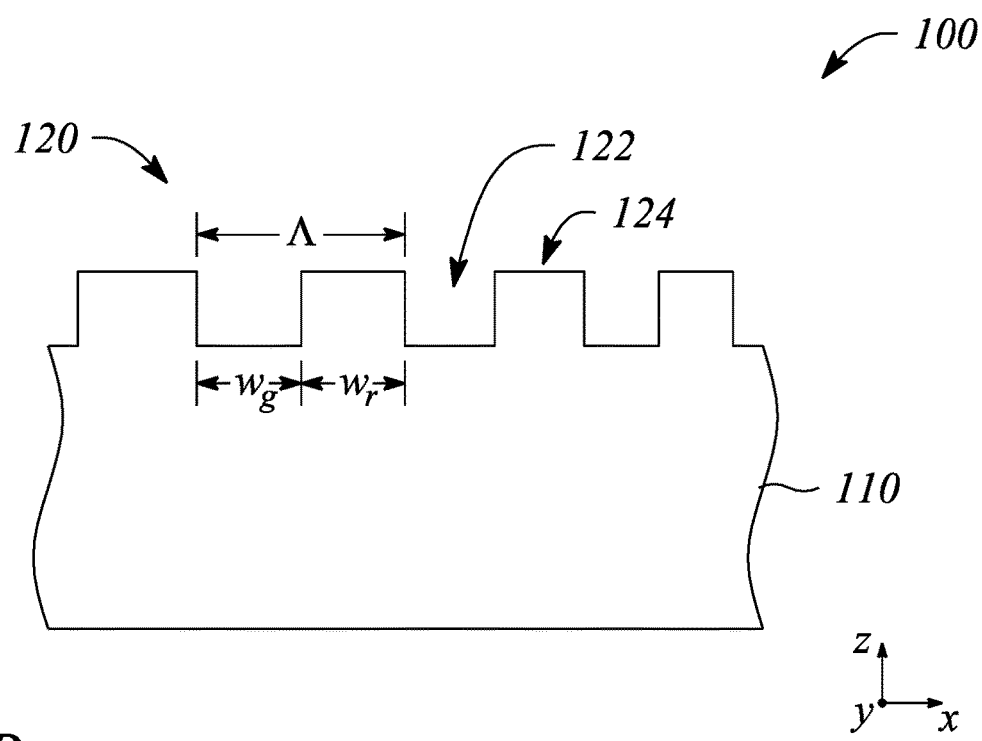
FIG. 1B illustrates a cross-sectional view of a portion of the privacy display of FIG. 1A in an example, according to an embodiment consistent with the principles described herein.
Figure 1C:
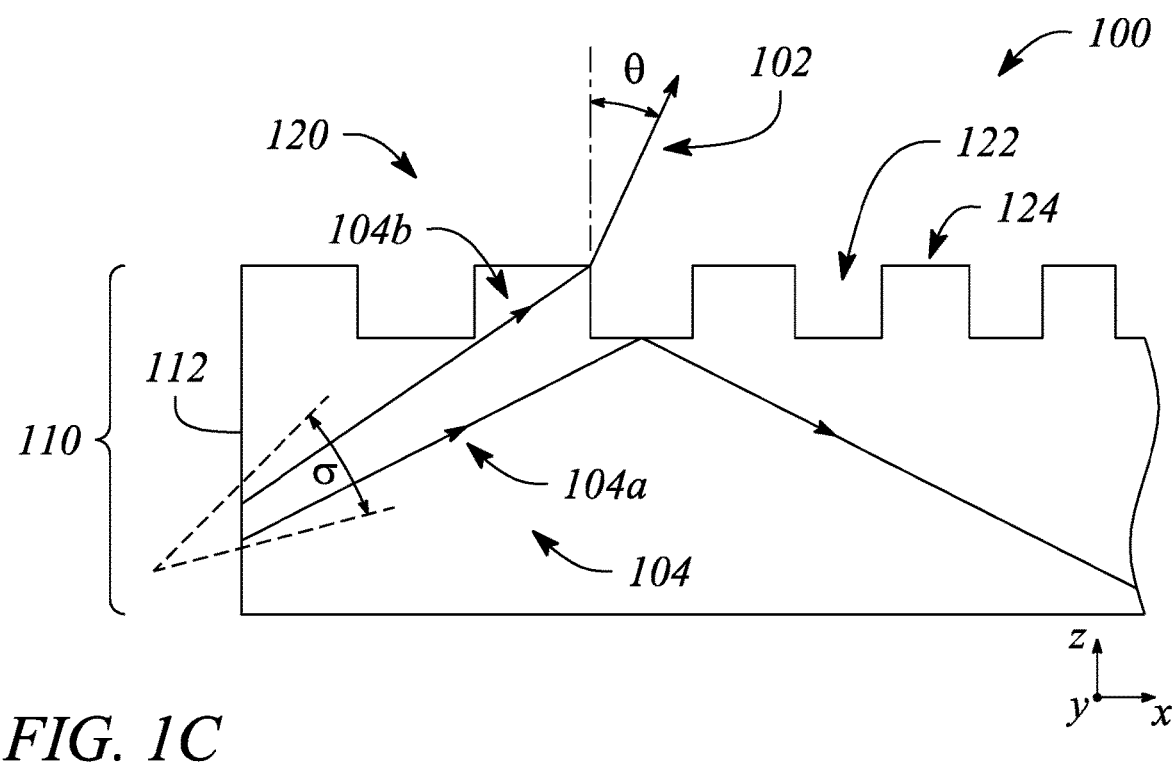
FIG. 1C illustrates a cross-sectional view of another portion of the privacy display of FIG. 1A in an example, according to an embodiment consistent with the principles described herein.

In accordance with some embodiments of the principles described herein, a privacy display is provided. FIG. 1A illustrates a side view of a privacy display 100 in an example, according to an embodiment consistent with the principles described herein. FIG. 1B illustrates a cross-sectional view of a portion of the privacy display 100 in FIG. 1A in an example, according to an embodiment consistent with the principles described herein. FIG. 1C illustrates a cross-sectional view of another portion of the privacy display 100 in FIG. 1A in an example, according to an embodiment consistent with the principles described herein.

The privacy display 100 is configured to provide or emit light, referred to herein as 'diffractively coupled-out' light 102, as illustrated in FIGS. 1A and 1C. Further, the privacy display 100 is configured to direct the diffractively coupled-out light 102 into a predefined region of space adjacent to (e.g., above, as illustrated) the privacy display 100. In particular, the diffractively coupled-out light 102 may be directed by the privacy display 100 into a viewbox 108 that is adjacent to the privacy display 100, as is described in more detail below. In some embodiments, primary rays of the diffractively coupled-out light 102 may be directed or 'aimed' at a center or midpoint of the viewbox 108. The privacy display 100 is also configured to modulate the diffractively coupled-out light 102 to 'form' or provide an image. In some embodiments, the image is provided exclusively in or only to the viewbox 108, i.e., as a 'private image'. The private image is configured to be preferentially or exclusively visible within viewbox 108 as well as within a viewing cone 106 of the viewbox 108 to provide viewing privacy, according to various embodiments.

According to various embodiments, the privacy display 100 comprises a light guide 110. The light guide 110 may be a plate light guide 110, in some embodiments (e.g., as illustrated herein). The light guide 110 is configured to guide light as guided light 104. In particular, the guided light 104 may propagate in a longitudinal direction (e.g., an x-direction, as illustrated) along a length of the light guide 110. Further, the guided light 104 is configured to propagate generally away from a light-entrance edge 112 of the light guide 110, e.g., as illustrated in FIGS. 1A and 1C. In FIG. 1A, bold arrows within the light guide 110 pointing away from the light-entrance edge 112 illustrate the primary propagation direction of the guided light 104 in the longitudinal direction, for example, along the light guide length.

According to various embodiments, the light guide 110 is configured to guide the guided light 104 using or according to total internal reflection. In particular, the light guide 110 may be an optical waveguide comprising an extended, substantially planar sheet or slab of optically transparent, dielectric material. As a plate optical waveguide, the light guide 110 may comprise any one of a number of different optically transparent materials including, but not limited to, various types of glass, such as silica glass, alkali-aluminosilicate glass, borosilicate glass, as well as substantially optically transparent plastics or polymers, such as, but not limited to, poly(methyl methacrylate) or acrylic glass, and polycarbonate. In some embodiments, the light guide 110 may include a cladding layer on at least a portion of a surface of the light guide 110 (not illustrated) to further facilitate total internal reflection.

In various embodiments, light may be coupled into the light guide 110 along the light-entrance edge 112 thereof. In particular, the light may be coupled into the light guide 110 at a predetermined non-zero angle to propagate within the light guide 110 as the guided light 104 at a non-zero propagation angle. Further, the light may be coupled into the light guide 110 according to a predetermined collimation factor σ. That is, the guided light 104 may be substantially collimated light and a range of angles of or defined by the collimation factor σ may represent an angular distribution of light rays within the coupled-in light that ultimately propagates within the light guide 110 as the guided light 104. According to various embodiments, the diffractively coupled-out light 102 may include a range of angles substantially similar to or at least determined by the collimation factor σ, or the range of angles defined therein. For example, dashed arrows adjacent to solid arrows representing the diffractively coupled-out light 102 in FIG. 1A illustrate a range of angles of various light beams or rays within the diffractively coupled-out light 102.

In an example, the collimation factor σ may represent an angular spread equal to or less than about plus or minus forty degrees (i.e., $\sigma \leq \pm 40°$). In other examples, the collimation factor σ may represent an angular spread equal to or less than about thirty degrees (i.e., $\sigma \leq \pm 30°$), equal to or less than about twenty degrees (i.e., $\sigma \leq \pm 20°$), or equal to or less than about 10 degrees (i.e., $\sigma \leq \pm 10°$). In yet other examples, the collimation factor σ may represent an angular spread that is less than about five degrees (i.e., $\sigma \leq \pm 5°$). As described below with respect to equation (1), a size of the viewbox 108 may be a function of the collimation factor σ. Further, in addition to having the predetermined collimation factor σ, the non-zero propagation angle of the guided light 104 is generally less than a critical angle of the light guide 110 with respect to total internal reflection.

As illustrated, the privacy display 100 further comprises a diffraction grating 120. In various embodiments, the diffraction grating 120 is optically coupled to the light guide 110. For example, the diffraction grating 120 may be located on, at or adjacent to a surface of the light guide 110. The surface may be one or both of a 'top' surface (e.g., a light emitting surface) and a 'bottom' surface of the light guide 110 (e.g., opposite the light emitting surface), for example. In FIGS. 1A-1C, the diffraction grating 120 is illustrated at the top or light-emitting surface of the light guide 110, by way of example and not limitation.

According to various embodiments, the diffraction grating 120 is configured to diffractively couple out a portion of the guided light 104 from within the light guide 110. In particular, the portion of guided light 104 may be diffractively coupled out as the diffractively coupled-out light 102. Further, the diffraction grating 120 is configured to direct the diffractively coupled-out light 102 into the viewbox 108 located adjacent to and spaced apart from the light guide surface (e.g., above the top surface, as illustrated). For example, FIG. 1A illustrates the diffractively coupled-out light 102 as arrows representing rays or beams of light (e.g., 'primary rays' or 'principal light beams') extending from the light guide surface to the viewbox 108. Moreover, the diffractively coupled-out light 102 may be substantially confined to the viewing cone 106 (e.g., a generally conical or pyramidal region or a 'light-transmission' cone) in a region of space between the light guide 110 and the viewbox 108 by the directing effects of the diffraction grating 120. The solid arrows representing principal light beams of the diffractively coupled-out light 102 are depicted as being directed or aimed at a center, midpoint or middle of the viewbox 108 in FIG. 1A. In other embodiments (not illustrated), the diffraction grating 120 may be configured to direct the light beams of the diffractively coupled-out light to other portions of the viewbox 108, e.g., the light beams or primary rays may be distributed substantially throughout the viewbox 108.

A portion of the privacy display 100 illustrated in the cross-sectional view of FIG. 1B depicts diffractive features of the diffraction grating 120 as ridges 124 that protrude in a z-direction from the light guide surface. Further, the ridges 124 are separated from one another by grooves 122, as illustrated. A combination of a groove 122 and an adjacent ridge 124 represents a 'diffractive feature,' as illustrated in FIG. 1B. In other instances, the ridges 124 and the grooves 122 individually may be referred to as diffractive features.

As illustrated in FIG. 1B, a width of a groove 122 is denoted by $w_g$ and a width of a ridge 124 is denoted by $w_r$.

Figure 2A:
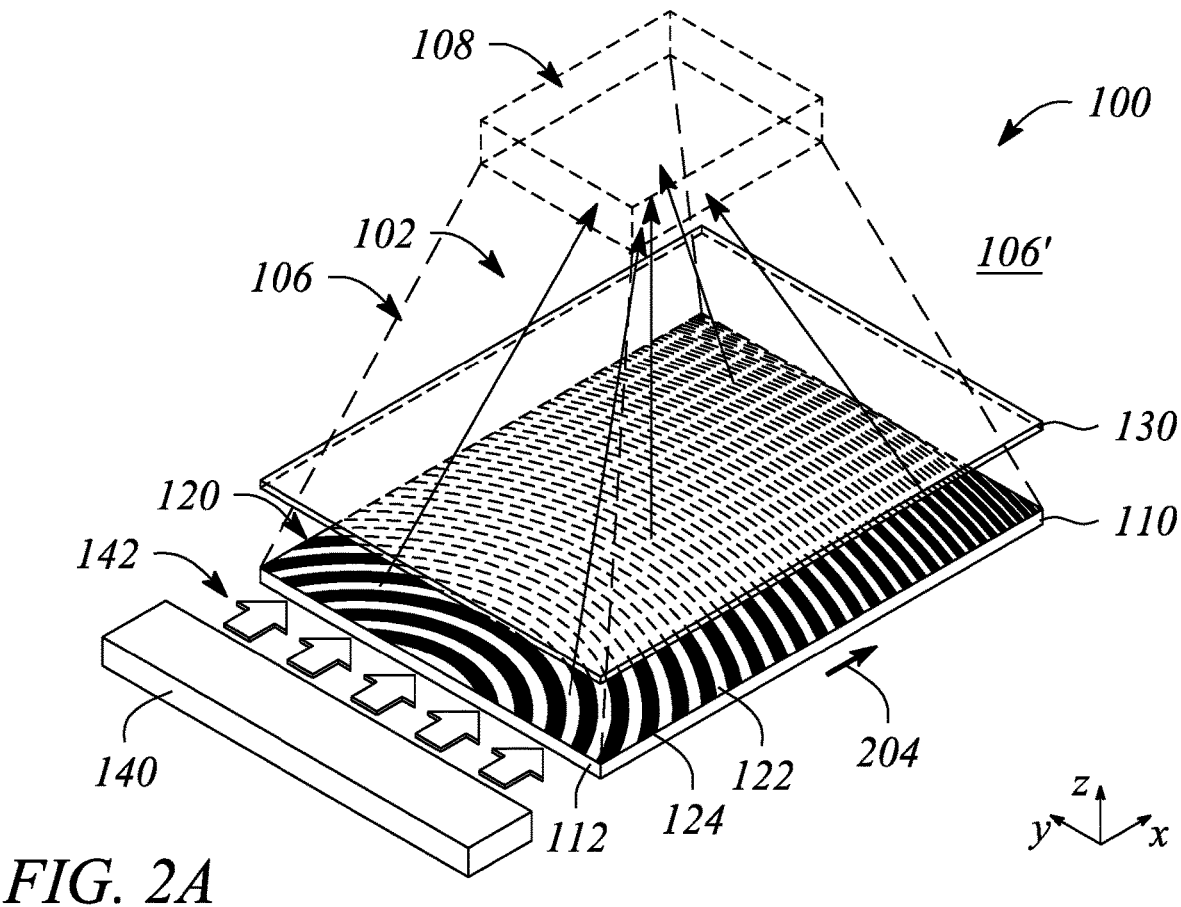
FIG. 2A illustrates a perspective view of a privacy display in an example, according to another embodiment consistent with the principles described herein.
Figure 2B:
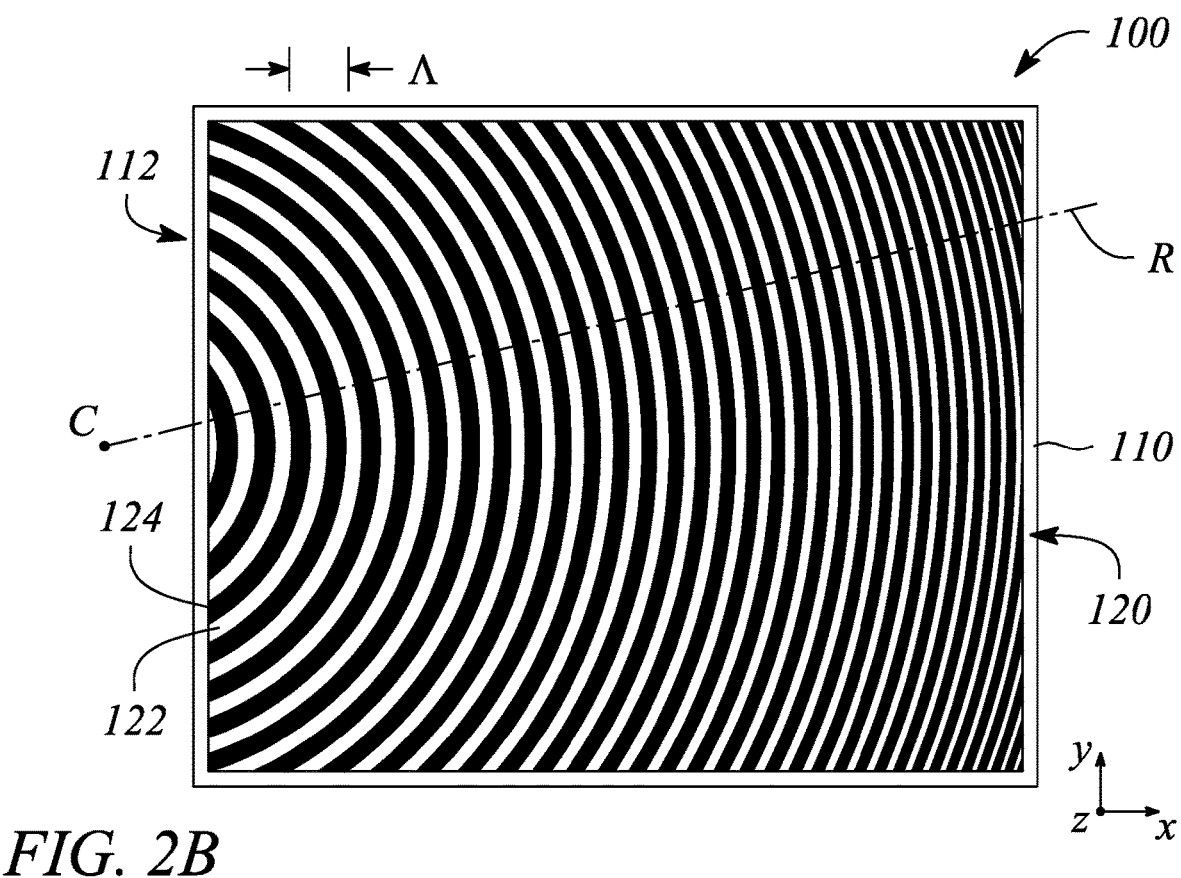
FIG. 2B illustrates a plan view of a portion of the privacy display of FIG. 2A in an example, according to an embodiment consistent with the principles described herein.

A sum of the groove width $w_g$ and the ridge width $w_r$ is defined as a 'feature spacing' herein and is denoted by $\Lambda$ (i.e., $\Lambda = w_g + w_r$). An alternate definition of feature spacing (e.g., when the ridges 124 or the grooves 122 are individually referred to as the diffractive features) may be a center-to-center distance between an adjacent pair of the ridges 124 (separated by a groove 122) or an adjacent pair of the grooves 122 (separated by a ridge 124), for example. According to some embodiments (e.g., as illustrated in FIGS. 2A-2B, described below), the widths of the grooves 122 and the ridges 124 may be substantially constant along of a length of the diffractive features (e.g., the length of the grooves 122 and the ridges 124). Further, in some embodiments, the feature spacing $\Lambda$ along the length of the diffractive features may be substantially constant, e.g., also as illustrated in FIGS. 2A-2B. Moreover, the feature spacing $\Lambda$ decreases from left to right in FIGS. 1B-1C, and in particular, the feature spacing $\Lambda$ decreases from the light-entrance edge 112 of the light guide 110 to an end of the light guide 110 that is opposite to an end at the light-entrance edge 112, as illustrated in FIG. 1C.

FIG. 1C illustrates a cross-sectional view of a portion of the privacy display 100, in particular, a portion of the light guide 110 near the light-entrance edge 112. As illustrated therein, light that is coupled into the light guide 110 along the light-entrance edge 112 propagates within the light guide 110 as the guided light 104 in the direction indicated by various extended arrows. As illustrated, some of the guided light 104, 104a is configured to remain within the light guide 110 due to total internal reflection. Other portions of the guided light 104, 104b is coupled-out by the diffraction grating 120 to become the diffractively coupled-out light 102, as further illustrated FIG. 1C. Additionally, the guided light direction is in a general direction of the decreasing feature spacing $\Lambda$ of the diffraction grating 120, as further described below.

In particular, an extended arrow in FIG. 1C represents a path of a ray of guided light 104a within the light guide 110 that is guided by total internal reflection. For example, the ray may 'bounce' or alternate between top and bottom surfaces of the light guide 110. That is, at various points along opposing top and bottom surfaces of the light guide 110, the guided light 104a may strike the opposing surfaces at angles less than a critical angle of the light guide 110. As such, the guided light 104a is substantially trapped by the total internal reflection within the light guide 110.

In FIG. 1C, another extended arrow represents a path of another ray of guided light 104, 104b that is coupled-out of the light guide 110 by the diffraction grating 120 as the diffractively coupled-out light 102, e.g., as a ray of diffractively coupled-out light 102. According to various embodiments, the guided light 104b that interacts with the diffraction grating 120 is diffractively coupled out of the light guide 110, e.g., as a first order diffraction beam. As illustrated, the diffractively coupled-out light 102 may represent first order, diffracted light that is diffractively coupled out of the light guide 110 at a diffraction angle $\theta$ with respect to a surface normal of the light guide 110. In various embodiments, a zero order diffraction beam of light as well as higher order diffraction beams of light associated with the diffraction grating 120 may be substantially suppressed.

In some embodiments, the diffraction grating 120 may comprise diffractive features that are substantially straight (e.g., straight along a length of the groove 122 or the ridge 124). Substantially straight diffractive features (e.g., both straight grooves 122 and ridges 124) may provide a viewbox 108 that is substantially one-dimensional. That is, the viewbox 108 may have a width (e.g., in the longitudinal direction of the light guide 110) and may further have another dimension (e.g., a length) that is in a direction that is orthogonal to the direction of the width. The other dimension or length may be either substantially unconstrained or constrained by a similar extent of the light guide 110, for example. In other embodiments, the diffraction grating 120 may comprise either curved diffractive features or diffractive features arranged to approximate a curve along a length of the diffractive feature. The curved diffractive features may provide a two-dimensional viewbox 108.

FIG. 2A illustrates a perspective view of the privacy display 100 in an example, according to an embodiment consistent with the principles described herein. FIG. 2B illustrates a plan view of a portion of the privacy display 100 of FIG. 2A in an example, according to an embodiment consistent with the principles described herein. In particular, as illustrated in FIGS. 2A-2B, the diffraction grating 120 is located at the surface of the light guide 110 of the privacy display 100 and comprises curved diffractive features. As illustrated, a diffraction pattern of the diffraction grating 120 is depicted as alternating black and white bands representing the curved diffractive features of the diffraction grating 120, e.g., one or both of grooves 122 and ridges 124 in or at a surface of the light guide 110. Further, as illustrated in FIG. 2B, concentric black and white curved lines represent concentric curved diffractive features (e.g., both of concentric curved ridges and concentric curved grooves) on the light guide surface, by way of example and not limitation. The concentric curved diffractive features have a center of curvature C, which is located beyond an edge of the light guide 110.

In some embodiments, the curved diffractive features of the diffraction grating 120 may be represented by semicircles (i.e., may be semicircular curved diffractive features). In other embodiments, a substantially non-circular curve may be employed to realize the curved diffractive features. For example, the curved diffractive features may have a hyperbolic-shaped curve. As such, the concentric curved diffractive features may be concentric hyperbolic-shaped curved diffractive features, in some embodiments. According to various embodiments, the curve of the diffractive features may be configured to direct and, in some examples, concentrate the diffractively coupled-out light 102 in two orthogonal directions in a plane of the viewbox 108. As such, the curved diffractive features may be configured to provide a two-dimensional viewbox 108 having a predetermined length and a predetermined width, for example. In various embodiments, the two-dimensional viewbox 108 may be located in a plane parallel to the light guide surface (e.g., see FIG. 2A).

According to various embodiments, a feature spacing of the diffractive features in the diffraction grating 120 may vary as a function of distance along the light guide length or in the propagation direction of light within the light guide 110. For example, as illustrated in the cross sectional view of FIG. 1C as well as in the plan view of FIG. 2B, the feature spacing $\Lambda$ of the diffraction grating 120 decreases with increasing distance from light-entrance edge 112 (or equivalently from the center of curvature C in FIG. 2B). The feature spacing $\Lambda$ is also illustrated to be decreasing as a function of distance from the light-entrance edge 112 of the light guide 110 in FIG. 2A. For curved diffractive features, the distance from the center of curvature or from the light-entrance edge 112 may be measured along a radius R, for example. The feature spacing A decrease as a function of distance may be referred to as a 'chirp' and the diffraction grating 120 may be a referred to as a 'chirped' diffraction grating, for example. Moreover, the decrease in feature spacing Λ may represent a linear function of distance, in some embodiments. In other embodiments, the feature spacing may decrease according to another (i.e., non-linear) function of distance including, but not limited to, an exponential function of distance and a hyperbolic function of distance.

Figure 3:
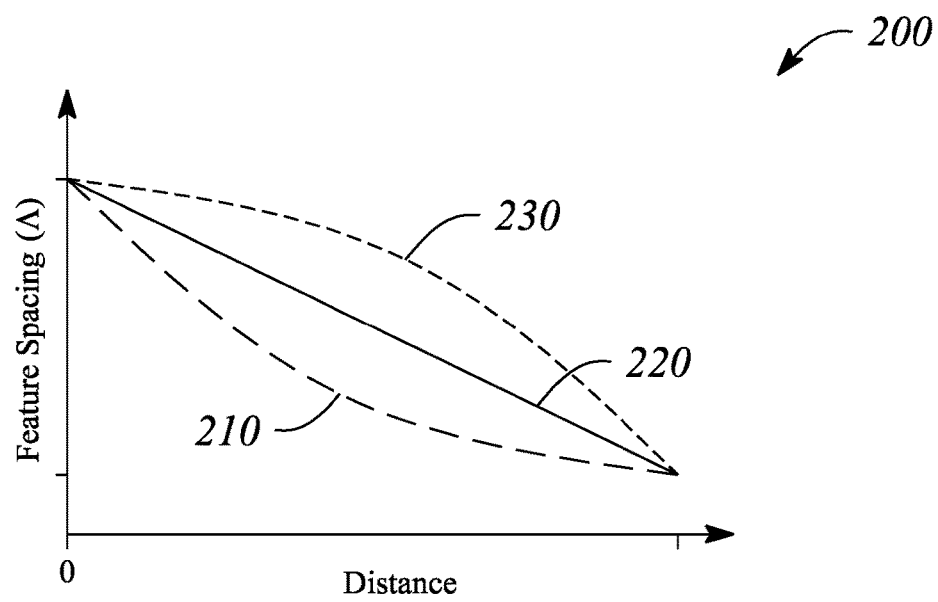
FIG. 3 illustrates a plot of diffractive feature spacing as a function of distance in an example, according to an embodiment consistent with the principles described herein.

FIG. 3 illustrates a plot 200 of diffractive feature spacing as a function of distance in an example, according to an embodiment consistent with the principles described herein. As illustrated, a horizontal axis represents distance (e.g., a distance from the light-entrance edge 112 or a radial distance from the center of curvature C along a radius R). For example, a point labeled '0' on the horizontal axis may represent an intersection of the radius R and the light-entrance edge 112 of the light guide 110 in FIG. 2B. A vertical axis in the plot 200 represents the feature spacing Λ of the diffractive features of the diffraction grating 120. Curves 210, 220 and 230 represent examples of different ways in which the feature spacing of the diffractive features may decrease with or as a function of increasing distance. In particular, the curve 210 represents an exponential decrease in feature spacing with increasing distance, e.g., from the center of curvature C. The curve 220 represents a linear decrease in feature spacing as a function of increasing distance, e.g., a linear chirp or linearly chirped diffraction grating. The curve 230 represents a hyperbolic decrease in feature spacing with increasing distance.

Referring again to FIG. 1A, as described above and as illustrated, the feature spacing of the diffraction grating 120 is configured to diffractively couple out and direct light into the viewbox 108 located a distance f from the privacy display 100. For example, the distance f may be measured from the top surface of the light guide 110 and may represent an intended viewing distance, as illustrated in FIG. 1A. According to various embodiments, an approximate width $w_{viewbox}$ of the viewbox 108 may be given by a product of the distance f and the collimation factor σ of the light propagating within the light guide 110 or, equivalently, the collimation factor σ at which light enters the light guide 110 along the light-entrance edge 112. In particular, the viewbox width $w_{viewbox}$ may be given by equation (1) as:

$$w_{viewbox} = f \cdot \sigma \quad (1)$$

In some embodiments, the viewbox width $w_{viewbox}$ in the longitudinal direction (e.g. light propagation direction) may be greater than about seventy millimeters (70 mm). A viewbox width $w_{viewbox}$ greater than about 70 mm may correspond to about an average interpupillary distance between eyes of a user viewing the privacy display 100, for example. In particular, the viewbox width $w_{viewbox}$ may be large enough to accommodate both eyes of the user to facilitate viewing of an image provided by the privacy display 100. However, the viewbox width $w_{viewbox}$ may also be small enough to substantially limit viewing by others outside of the viewbox 108, and effectively, substantially limit viewing by others located outside of the viewing cone 106, for example.

In particular, as is discussed above, the diffractively coupled-out light 102 provided by the privacy display 100 may be substantially directed into the viewbox 108 or equivalently substantially confined within viewing cone 106 delineated by dashed lines in FIG. 1A. As such, light from, as well as an image provided by, the privacy display 100 may preferentially or exclusively enter a user's eyes when the user's eyes are located within the viewbox 108. However, when another's eyes are located either outside the viewbox 108 or outside the viewing cone 106 (e.g., in a region 106'), the light from, as well as the image provided by, the privacy display 100 will substantially not enter the other's eyes and thus be visible. As such, the privacy display 100 and in particular the diffraction grating 120 may appear substantially black (i.e., unlit) when viewed from outside the viewbox 108 or from outside the viewing cone 106.

In some embodiments, a cone angle of the viewing cone 106 may be a negative cone angle. Herein a 'negative cone angle' is defined as a cone angle of emitted light that concentrates or directs light toward either a point in space or a relatively confined region of space. In other words, a negative cone angle produces a viewing cone 106 that include converging light. As such, the viewing cone 106 generally decreases in size as a function of distance from the privacy display 100 with a negative cone angle, at least until the point in space is reached at which the light is directed. By way of example and not limitation, the viewing cones 106 in FIGS. 1A and 2A each have a negative cone angle, as illustrated. By contrast, a positive cone angle generally results in diverging emitted light, by definition herein.

In some embodiments, the privacy display 100 further comprises a light valve array 130. As illustrated in FIGS. 1A and 2A, the light valve array 130 is located between the light guide 110 and the viewbox 108. The light valve array 130 is configured to modulate the diffractively coupled-out light 102 to form or provide an image at or in the viewbox 108. In particular, individual light valves of the light valve array 130 may be independently configured to provide pixels that together form the image at the viewbox 108. According to various embodiments, the provided image is viewable by a user within the viewbox 108 (and in some examples, within the viewing cone 106). As such, the user may view the image when the user's eyes are within the viewbox 108. According to various embodiments, the formed image may not be viewable outside of the viewbox 108 or viewing cone 106, e.g., in region 106'. In some examples, 'by not viewable' from the region 106' means that the formed image may appear substantially black.

According to various embodiments, the light valve array 130 may comprise substantially any of a variety of light valves including, but not limited to, liquid crystal light valves, electrowetting light valves, electrophoretic light valves or a combination of these. Further, as shown in FIGS. 1A and 2A, the light valve array 130 may be oriented substantially parallel to the light guide 110 to intersect the viewing cone 106 to which the diffractively coupled-out light 102 is confined. For example, the light valve array 130 may comprise an array of liquid crystal light valves, each of which may be individually operated as a pixel by modulating an amount of light passing through a light valve. In some embodiments, the light valves may be colored light valves (i.e., a light valve may include a color filter). For example, the light valve array 130 may comprise a plurality of red light valves, a plurality of green light valves, and a plurality of blue light valves. Together the red, green and blue light valves of the light valve array 130 may provide a red-green-blue (RGB) based 'full color' formed image by modulating the diffractively coupled-out light 102, for example. In particular, the diffractively coupled-out light 102 passing through individual ones of light valves of the light valve array 130 may be selectively modulated to create a full color image or a black and white image in the viewbox 108 and the viewing cone 106.

In some embodiments (e.g., as illustrated in FIG. 2A), the privacy display 100 further comprises a light source 140.

The light source 140 is optically coupled to the light guide 110. For example, the light source 140 may be optically coupled to the light guide 110 along the light-entrance edge 112, as illustrated in FIG. 2A. The light source 140 is configured to generate and inject light 142 into the light guide 110 as the guided light 104 having the collimation factor σ, according to various embodiments. The light source 140 includes an optical emitter such as, but not limited to, a light emitting diode (LED), an organic LED (OLED), a polymer LED, a plasma-based optical emitter, fluorescent lamp, an incandescent lamp. According to various embodiments, light output by the light source 140 may comprise monochromatic light or polychromatic light. For example, the light may comprise a single color of light (e.g., red light, green light, or blue light), a plurality of colors of light, or light that is substantially white light.

According to various embodiments, the diffraction grating 120 of the privacy display 100 may be provided according to any of a variety different microfabrication or nanoscale fabrication techniques including, but not limited to, wet etching, ion milling, photolithography, imprint lithography, anisotropic etching, plasma etching, or a combination thereof. For example, as shown in FIGS. 1A-1C, the diffraction grating 120 of the privacy display 100 may be provided in a surface of a slab of optically transparent, dielectric material of the light guide 110 using ion milling or plasma etching. In another embodiment, the diffraction grating 120 of the privacy display 100 may be provided by depositing a layer of dielectric material, a metal or another reflective material, or a combination of both on a surface of the light guide 110. Depositing the layer may be followed by etching the deposited layer to form the diffraction grating 120, for example. In yet another example, the diffraction grating 120 may be formed in a material layer that is then subsequently affixed to a surface of the light guide 110.

In some embodiments, the diffraction grating 120 may comprise a transmission mode diffraction grating. In other embodiments, the diffraction grating 120 may comprise a reflection mode diffraction grating. In yet other embodiments, the diffraction grating 120 comprises both a transmission mode diffraction grating and a reflection mode diffraction grating.

In particular, the diffraction grating 120 may comprise a transmission mode diffraction grating at light emitting surface of the light guide 110, e.g., as illustrated in FIG. 1A. Alternatively, the diffraction grating 120 may comprise a reflection mode diffraction grating at another surface of the light guide 110 that is opposite to the light-emitting surface. According to various examples, the diffractive grating 120 may include grooves, ridges or similar diffractive features formed or otherwise provided on or in the surface(s) of the light guide 110. For example, grooves or ridges may be formed in or on the light-emitting surface of the light guide 110 to serve as the transmission mode diffraction grating (e.g., as illustrated in FIGS. 1B-1C). Alternatively, grooves or ridges may be formed or otherwise provided in or on the opposite surface to serve as the reflection mode diffraction grating, for example.

According to some embodiments, the diffraction grating 120 may include a grating material (e.g., a layer of grating material) on or in the respective light guide surface. As such, the grating material may be substantially similar to a material of the light guide 110. In other examples, the grating material may differ (e.g., have a different refractive index) from the light guide material. For example, the diffractive grating grooves in the light guide surface may be filled with the grating material. In particular, grooves of the diffraction grating 120 that is either transmissive or reflective may be filled with a dielectric material (i.e., the grating material) that differs from a material of the light guide 110. The grating material of the diffraction grating 120 may include silicon nitride, for example, while the light guide 110 may be glass, according to some examples. Other grating materials including, but not limited to, indium tin oxide (ITO) may also be used.

In other embodiments, the diffraction grating 120, whether transmissive or reflective, may include ridges, bumps, or similar diffractive features that are deposited, formed or otherwise provided on the respective surface of the light guide 110. The ridges or similar diffractive features may be formed (e.g., by etching, molding, etc.) in a dielectric material layer (i.e., the grating material) that is deposited on the respective surface of the light guide 110, for example. In some examples, the grating material of the diffraction grating 120 may include a reflective metal. For example, a reflection mode diffraction grating may comprise a layer of reflective metal such as, but not limited to, gold, silver, aluminum, copper or tin, to facilitate reflection in addition to diffraction.

Figure 4A:
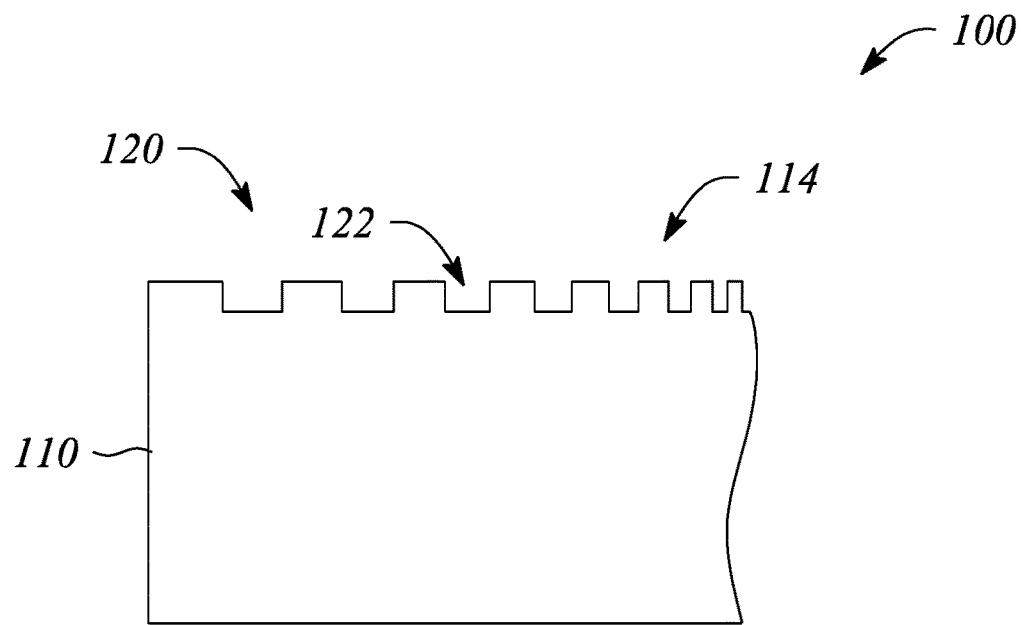
FIG. 4A illustrates a cross sectional view of a portion of a privacy display in an example, according to an embodiment consistent with the principles described herein.
Figure 4B:
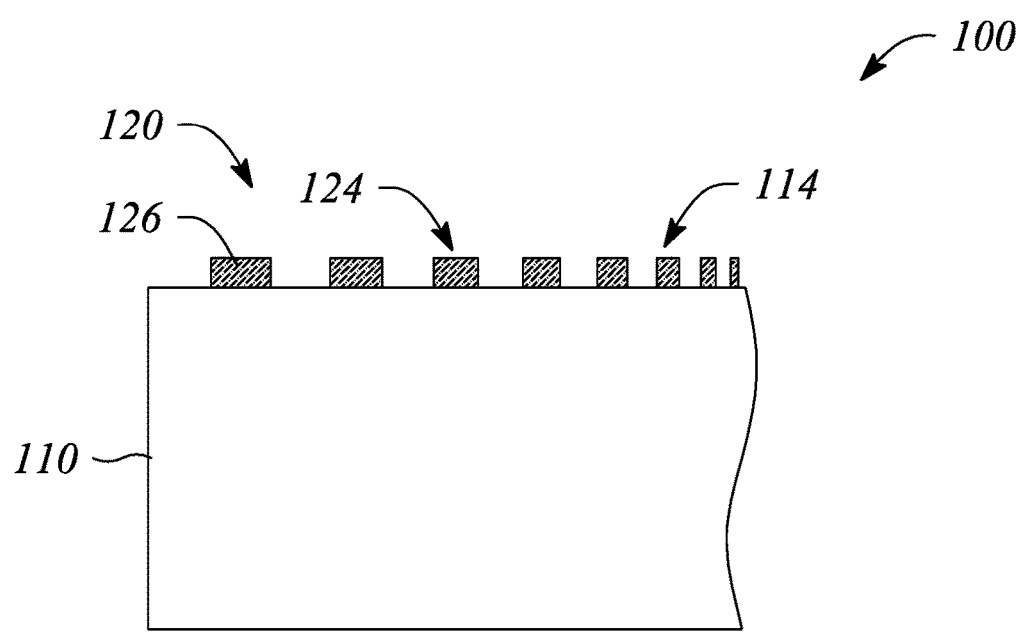
FIG. 4B illustrates a cross sectional view of a portion of a privacy display in an example, according to another embodiment consistent with the principles described herein.

FIG. 4A illustrates a cross sectional view of a portion of a privacy display 100 in an example, according to an embodiment consistent with the principles described herein. FIG. 4B illustrates a cross sectional view of a portion of a privacy display 100 in an example, according to another embodiment consistent with the principles described herein. In particular, both FIGS. 4A and 4B may illustrate a privacy display 100 portion that includes a portion of the light guide 110 and a portion of the diffraction grating 120. Further, the diffraction grating 120 illustrated in FIGS. 4A-4B is a transmission mode diffraction grating.

As illustrated in FIG. 4A, the diffraction grating 120 comprises grooves 122 (i.e., diffractive features) formed in the light-emitting surface 114 of the light guide 110 to form the transmission mode diffraction grating. FIG. 4B illustrates a diffraction grating 120 comprising ridges 124 of a grating material 126 on the light-emitting surface 114 of the light guide 110 to form a transmission mode diffraction grating. Etching or molding a deposited layer of the grating material 126, for example, may produce the ridges 124. In some embodiments, the grating material 126 that makes up the ridges 124 may include a material that is substantially similar to a material of the light guide 110. In other embodiments, the grating material 126 may differ from the material of the light guide 110, e.g., as illustrated in FIG. 4B. For example, the light guide 110 may include a glass or a plastic/polymer sheet or slab and the grating material 126 may be a different material such as, but not limited to, silicon nitride, that is deposited on the light guide 110.

Figure 5A:
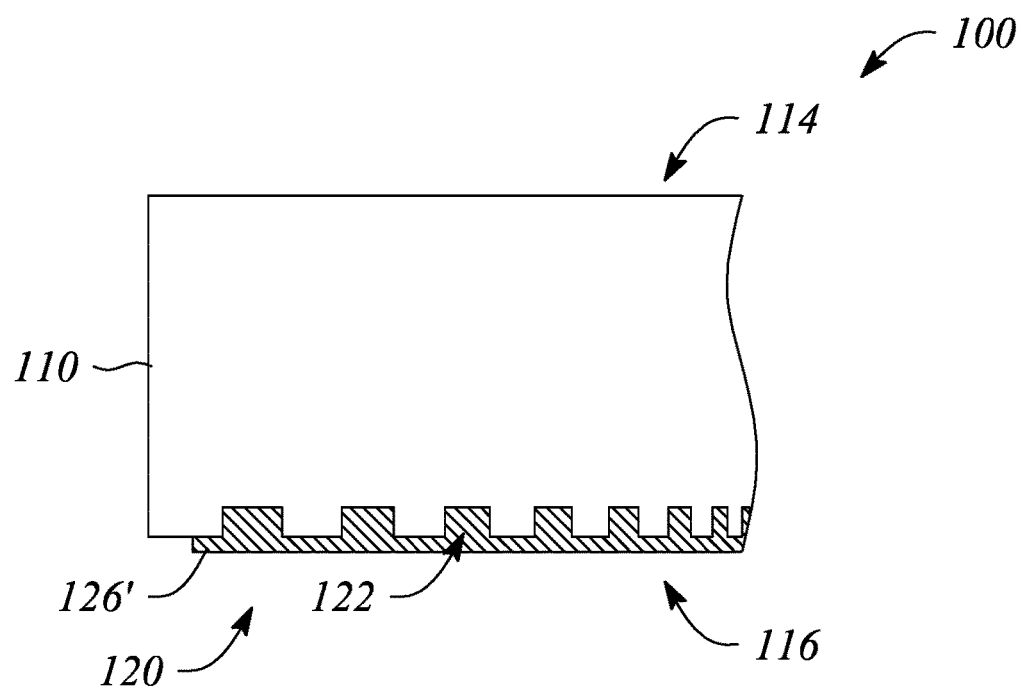
FIG. 5A illustrates a cross sectional view of a portion of a privacy display in an example, according to another embodiment consistent with the principles described herein.
Figure 5B:
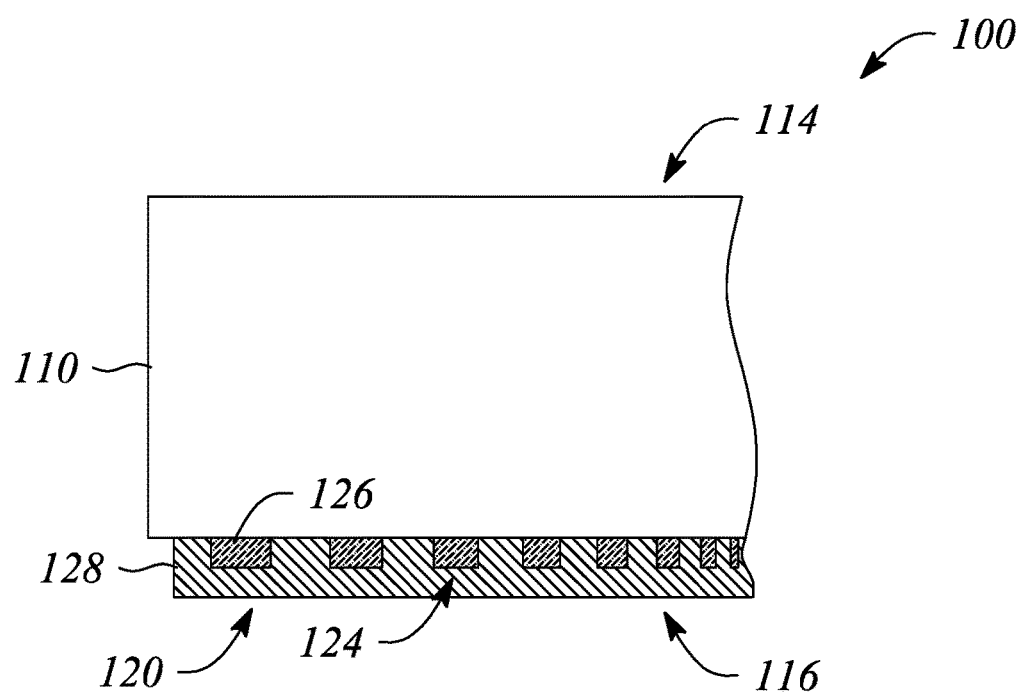
FIG. 5B illustrates a cross sectional view of a portion of a privacy display in an example, according to another embodiment consistent with the principles described herein.

FIG. 5A illustrates a cross sectional view of a portion of a privacy display 100 in an example, according to another embodiment consistent with the principles described herein. FIG. 5B illustrates a cross sectional view of a portion of a privacy display 100 in an example, according to another embodiment consistent with the principles described herein. In particular, both FIGS. 5A and 5B illustrate portions of the light guide 110 and of the diffraction grating 120. Further, the diffraction grating 120 illustrated in FIGS. 5A-5B is a reflection mode diffraction grating. As illustrated, the diffraction grating 120 as a reflection mode diffraction grating is at or on a surface 116 of the light guide 110 opposite to the light-emitting surface 114.

In FIG. 5A, the diffraction grating 120, as a reflection mode diffraction grating, comprises grooves 122 provided in the surface 116 of the light guide 110 and a grating material 126' in the grooves 122. In this example, the grooves 122 are filled with and further backed by the grating material 126'. Further, the grating material 126' illustrated in FIG. 5A may comprise a metal or similar reflective material to provide additional reflection and improve a diffractive efficiency of the diffraction grating 120. In other examples (not illustrated), the grooves may be filled with a grating material (e.g., silicon nitride) and then backed or substantially covered by a metal layer, for example.

FIG. 5B illustrates a diffraction grating 120 as a reflection mode diffraction grating including ridges 124 of the grating material 126 on the surface 116 of the light guide 110. The ridges 124 may be etched in a layer of the grating material 126 (e.g., silicon nitride) applied to the light guide 110, for example. In some examples, a metal layer 128 is provided to substantially cover the ridges 124 of the reflection mode diffraction grating to provide increased reflection and improve the diffractive efficiency, for example.

In some embodiments (e.g., as illustrated in FIGS. 1A and 2A-2B), the diffraction grating 120 of the privacy display 100 may be a single diffraction grating configured to substantially cover a light-emitting portion of the light guide 110. In other embodiments, the diffraction grating 120 of the privacy display 100 may comprise a plurality of sub-gratings, wherein each diffractive grating sub-grating of the plurality is located in a different region of the light guide 110. In some embodiments, the diffractive grating sub-gratings may be separated from one another (i.e., by spaces or areas on the light guide 110 without diffractive features). In various embodiments, the plurality of diffractive grating sub-gratings is configured to cooperatively concentrate the diffractively coupled-out light 102 into the viewbox 108.

Figure 6A:
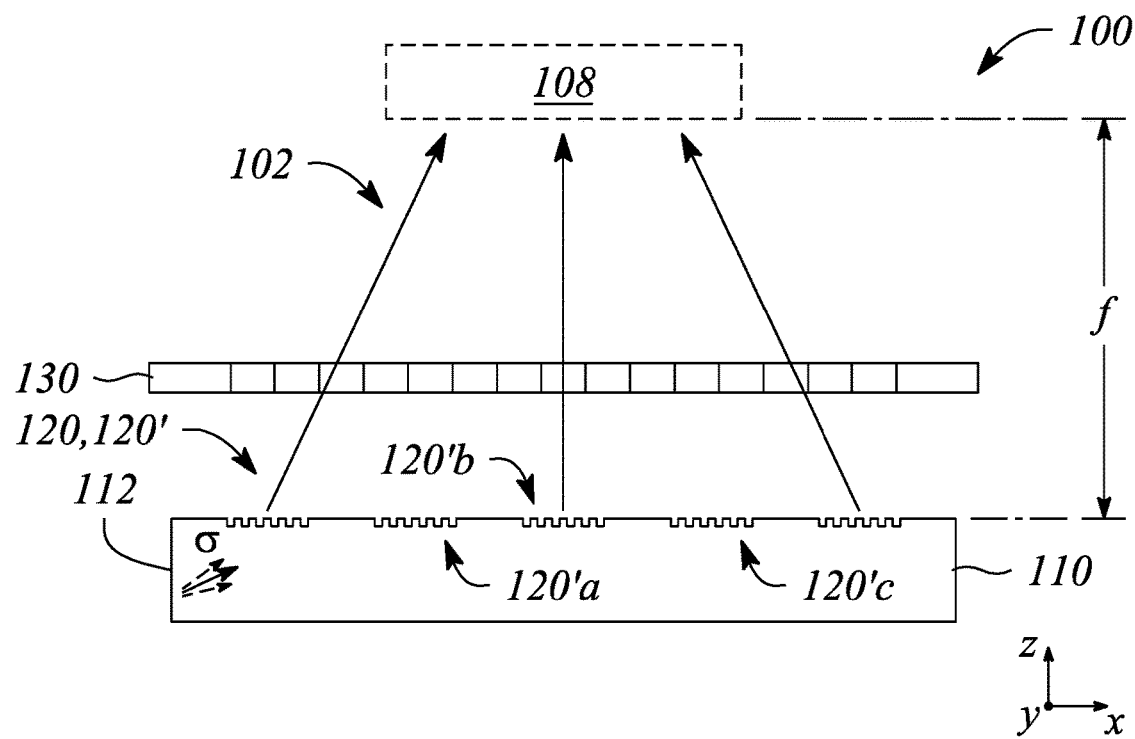
FIG. 6A illustrates a side view of a privacy display having a plurality of sub-gratings in an example, according to an embodiment consistent with the principles described herein.

FIG. 6A illustrates a side view of a privacy display 100 having a plurality of sub-gratings 120' in an example, according to an embodiment consistent with the principles described herein. In particular, FIG. 6A illustrates a privacy display 100 comprising the light guide 110, the diffraction grating 120 and the light valve array 130, as described above. Further, as illustrated, the diffraction grating 120 comprises a plurality of sub-gratings 120' (with individually labeled sub-gratings 120'a, 120'b, 120'c for purposes of discussion below). The sub-gratings 120' are spaced apart from one another at a surface of a light guide 110. In the privacy display 100 of FIG. 6A, light may be coupled into the light guide 110 along the light-entrance edge 112 with or having the collimation factor σ. The plurality of sub-gratings 120' of the diffraction grating 120 is configured to diffractively couple out a portion of the light guided in the light guide 110 as the diffractively coupled-out light 102. Further, the sub-gratings 120' of the plurality are configured to cooperatively direct the diffractively coupled-out light 102 into the viewbox 108 at a distance f from the light guide 110.

Figure 6B:
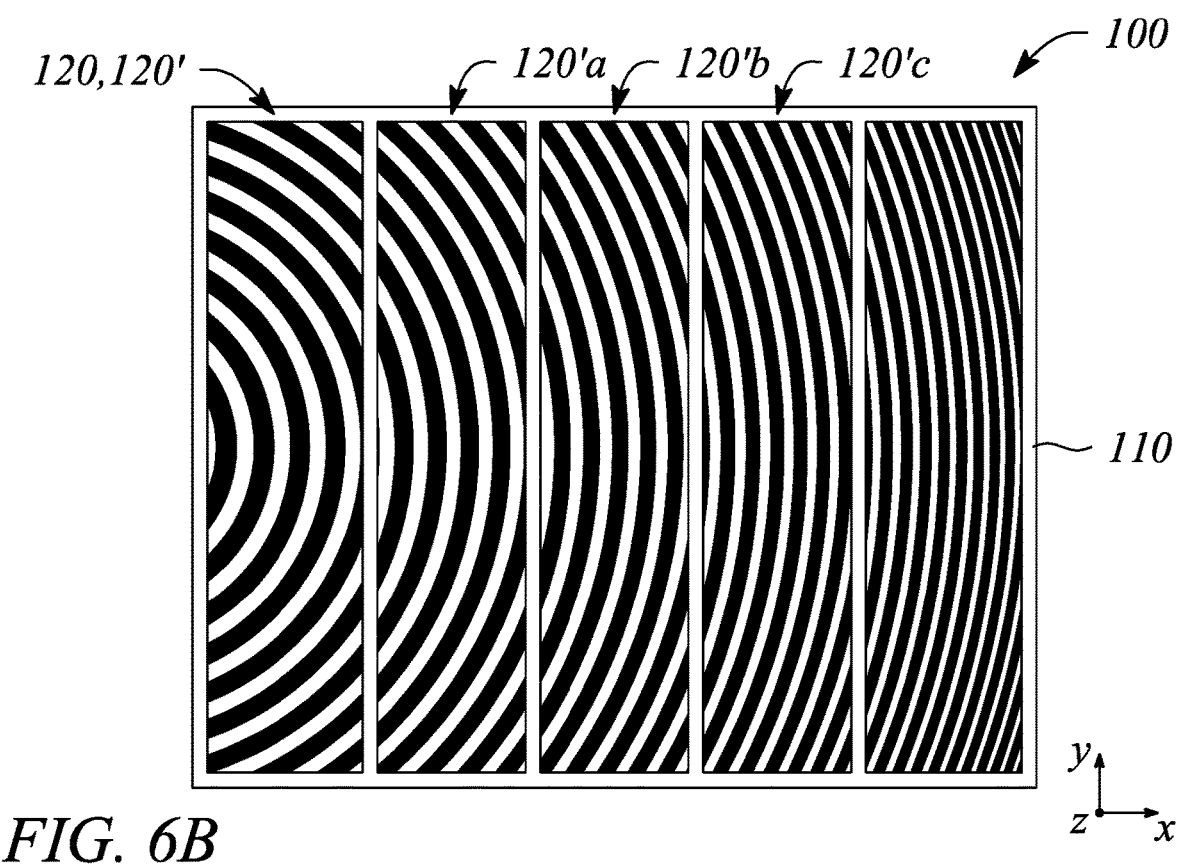
FIG. 6B illustrates plan view of a portion of a privacy display having a plurality of sub-gratings in an example, according to another embodiment consistent with the principles described herein.

FIG. 6B illustrates a plan view of a portion of a privacy display 100 having a plurality of sub-gratings 120' in an example, according to another embodiment consistent with the principles described herein. The privacy display 100 of FIG. 6B may be substantially similar to the privacy display 100 illustrated in FIG. 6A, for example. In particular, as illustrated in FIG. 6B, the sub-gratings 120' of the diffraction grating 120, e.g., including the individually labeled sub-gratings 120'a, 120'b, 120'c, form strips across the light guide surface in a y-direction. The width of the diffractive features and feature spacing (e.g., grooves or ridges) within each sub-grating 120' decrease from left to right in the x-direction (longitudinal direction of the light guide 110). Further, as illustrated, spaces are provided between adjacent ones of the strips that form the sub-gratings 120'. The spaces may represent un-patterned or un-etched regions of the light guide surface, for example. Together, the sub-gratings 120' of the plurality may approximate a single or continuous diffraction grating 120, e.g., representing a sub-grating embodiment of the diffraction grating 120 illustrated in FIG. 2B.

Figure 6C:
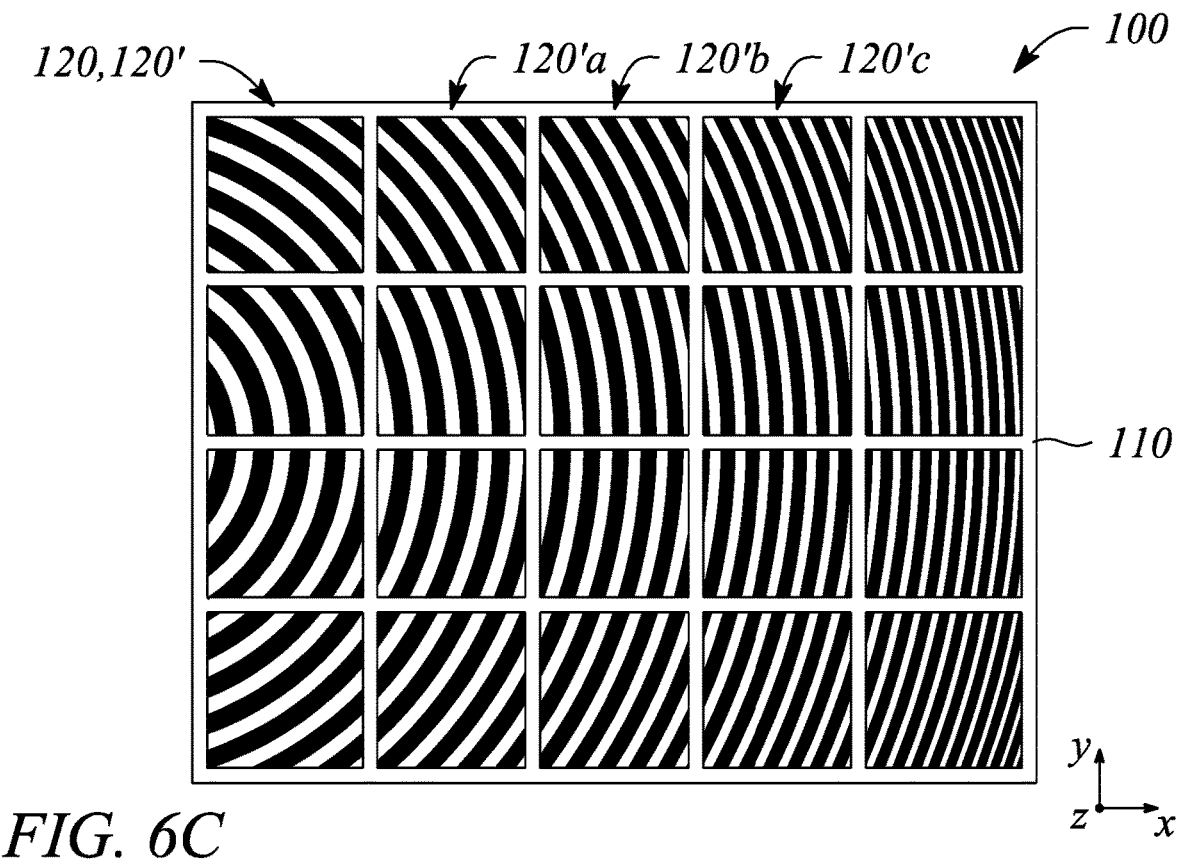
FIG. 6C illustrates a plan view of a portion of a privacy display having a plurality of sub-gratings in an example, according to another embodiment consistent with the principles described herein.

FIG. 6C illustrates a plan view of a portion of a privacy display 100 having a plurality of sub-gratings 120' in an example, according to another embodiment consistent with the principles described herein. In particular, as illustrated in FIG. 6C, the sub-gratings 120' of the diffraction grating 120 comprise regions (e.g., rectangular regions of one or both of curved grooves and curved ridges) separated by spaces running in both an x-direction and the y-direction. The width of the diffractive features and feature spacing (e.g., grooves or ridges) within each sub-grating 120' decrease from left to right in the x-direction (longitudinal direction of the light guide 110). The privacy display 100 of FIG. 6C may be substantially similar to the privacy display 100 illustrated in FIG. 6A, for example. As illustrated in FIG. 6C, the sub-gratings 120' of the plurality, e.g., including the individually labeled sub-gratings 120'a, 120'b, 120'c, form a two-dimensional array across the light guide surface in both the x-direction and the y-direction. Also as illustrated in FIG. 6B, the sub-gratings 120' illustrated in FIG. 6C may approximate a single diffraction grating 120, e.g., representing another sub-grating embodiment of the diffraction grating 120 illustrated in FIG. 2B.

Figure 6D:
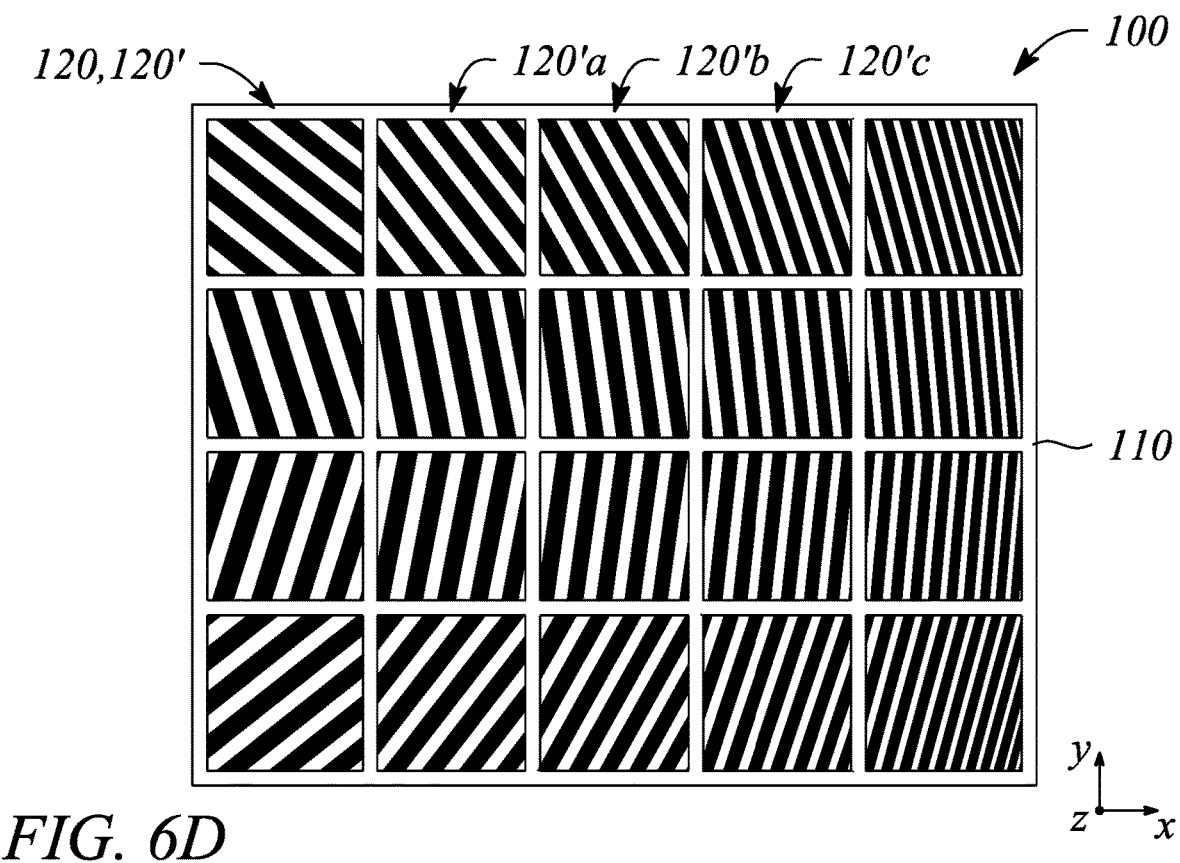
FIG. 6D illustrates a plan view of a portion of a privacy display having a plurality of sub-gratings in an example, according to another embodiment consistent with the principles described herein.

In some embodiments, the sub-gratings 120' may comprise substantially straight diffractive features arranged on the light guide 110 to approximate curved diffractive features. FIG. 6D illustrates a plan view of a portion of a privacy display 100 having a plurality of sub-gratings 120' in an example, according to another embodiment consistent with the principles described herein. As illustrated in FIG. 6D, different ones of the sub-gratings 120' have different feature spacing and different diffraction grating orientations that collectively approximate curved (albeit, piece-wise curved) diffractive features of the diffraction grating 120. Moreover, the width of the diffractive features and feature spacing (e.g., grooves or ridges) within each sub-grating 120' decrease from left to right in the x-direction (longitudinal direction of the light guide 110). For example, the approximated curved diffractive features, in combination, may substantially approximate the curved diffractive features of the diffraction grating 120 illustrated in FIG. 2B. Moreover, the privacy display 100 of FIG. 6D may be substantially similar to the privacy display 100 illustrated in FIG. 6A, for example. In particular, as illustrated in FIG. 6D, the sub-gratings 120', e.g., including the individually labeled sub-gratings 120'a, 120'b, 120'c, form another two-dimensional array across the light guide surface in both the x-direction and they-direction, e.g., representing another sub-grating embodiment of the diffraction grating 120.

Note that, in various illustrations herein, cross-sectional views of the diffractive features are represented by rectangular-shaped grooves and ridges for ease of illustration and not by way of limitation. In particular, according to various embodiments, the diffractive features of the diffraction grating may have any of a variety of other cross-sectional shapes including, but not limited to, a saw-tooth shape, a trapezoidal shape, or a hemispherical shape. For example, diffractive features of the diffraction grating may have ridges with a trapezoidal cross section.

Figure 7A:
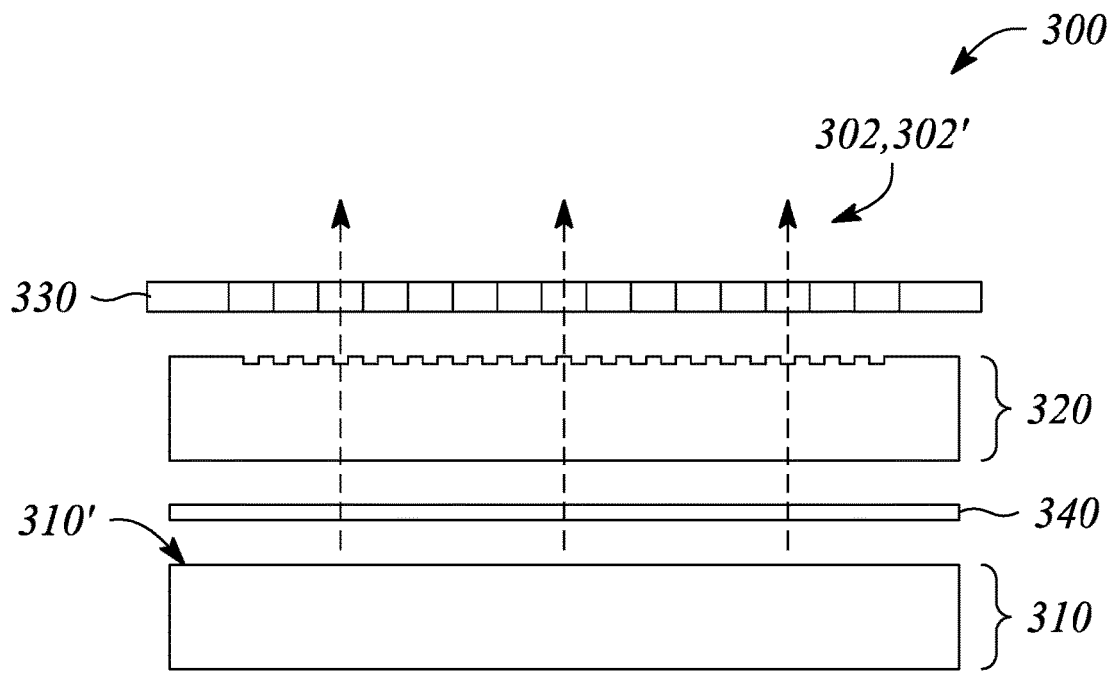
FIG. 7A illustrates a side view of a dual-mode privacy display system in an example, according to an embodiment consistent with the principles described herein.
Figure 7B:
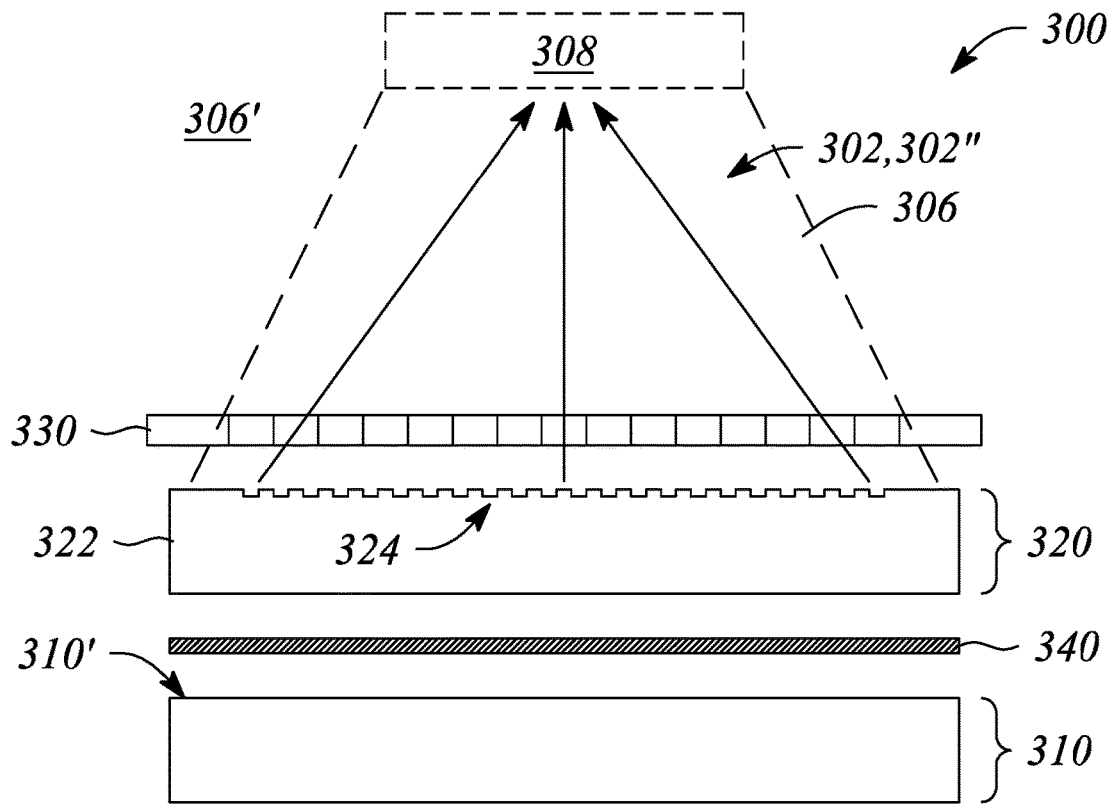
FIG. 7B illustrates a side view of a dual-mode privacy display system in another example, according to an embodiment consistent with the principles described herein.

In accordance with other embodiments consistent with the principles described herein, a dual-mode privacy display system is provided. FIG. 7A illustrates a side view of a dual-mode privacy display system 300 in an example, according to an embodiment consistent with the principles described herein. FIG. 7B illustrates a side view of a dual-mode privacy display system 300 in another example, according to an embodiment consistent with the principles described herein. The dual-mode privacy display system comprises a privacy operation mode and a public operation mode. In particular, FIG. 7A illustrates the dual-mode privacy display system 300 in or during a privacy mode of operation and FIG. 7B illustrates the dual-mode privacy display system 300 in or during a public mode of operation.

The dual-mode privacy display system 300 is configured to provide an image formed by or using modulation of emitted light 302 in or during each of the private and public modes. In the private mode, the dual-mode privacy display system 300 is configured to provide a private image. According to various embodiments, the private image may be configured to be exclusively visible within a viewing cone 306 of a viewbox 308. Moreover, the private image is substantially not visible in a region 306' outside of the viewing cone 306. In some embodiments, the viewing cone 306 and the viewbox 308 may be substantially similar, respectively, to the viewing cone 106 and viewbox 108, described above with respect to the privacy display 100. In the public mode, the dual-mode privacy display system 300 is configured to provide a public image. The public image is configured to be visible both inside and outside the viewbox 308 and the viewing cone 306, according to various embodiments. The dual-mode privacy display system 300 is configured to be switchable between the privacy mode and the public mode. The dual-mode privacy display system 300 may be switchable between the privacy mode and the public mode to provide private images when a user wants privacy and public images otherwise, for example.

As illustrated in FIGS. 7A and 7B, the dual-mode privacy display system 300 comprises a broad-angle backlight 310. The broad-angle backlight 310 is configured to provide broad-angle emitted light 302, 302' in the public mode (of operation). By definition, 'broad-angle' emitted light 302' is defined as light having a cone angle that is greater than a cone angle of the viewing cone 306 of the viewbox 308. For example, if the viewing cone 306 has a negative cone angle, the broad-angle light may have a positive cone angle. In some examples, the broad-angle light may have a cone angle that is greater than about ten degrees (e.g., $>\pm 10°$). In other examples, the broad-angle light cone angle may be greater than about twenty degrees (e.g., $>\pm 20°$), or greater than about thirty degrees (e.g., $>\pm 30°$), or greater than forty degrees (e.g., $>\pm 40°$). For example, the cone angle of the broad-angle light may be about sixty degrees (e.g., $>\pm 60°$). In some examples, the broad-angle light cone angle may be about the same as a viewing angle of an LCD computer monitor, an LCD tablet, an LCD television, or a similar digital display device meant for broad-angle viewing (e.g., about $\pm 40\text{-}65°$).

Broad-angle emitted light 302 provided by the broad-angle backlight 310 may also be characterized as diffuse light, in some examples. The broad-angle emitted light 302, 302' is illustrated in FIG. 7A as a dashed arrows for ease of illustration. However, the dashed arrows representing the broad-angle emitted light 302, 302' in FIG. 7A are not meant to imply any particular directionality of the emitted light 302, but instead merely represent the emission and transmission of light, e.g., from the broad-angle backlight 310 through a diffraction grating-based backlight 320 and a light valve array 330, described below.

According to some embodiments, the broad-angle backlight 310 has a light-emitting surface 310' configured to provide the broad-angle emitted light 302, 302' (e.g., as illustrated in FIG. 7A). Moreover, the light-emitting surface 310' may be substantially planar, in some embodiments. For example, the broad-angle backlight 310 may be a direct-emitting or directly illuminated planar backlight having a planar light-emitting surface 310'. Direct-emitting or directly illuminated planar backlights include, but are not limited to, a backlight panel employing a planar array of cold-cathode fluorescent lamps (CCFLs), neon lamps or light emitting diodes (LEDs), that are configured to directly illuminate the planar light-emitting surface 310' and provide the broad-angle emitted light 302, 302'. An electroluminescent panel (ELP) is another non-limiting example of a direct-emitting planar backlight.

In other examples, the broad-angle backlight 310 may comprise a backlight that employs an indirect light source. Such indirectly illuminated backlights may include, but are not limited to, any one or more of various forms of edge-coupled or so-called 'edge-lit' backlights. An edge-lit backlight typically includes a light source (not illustrated in FIGS. 7A-7B) coupled to an edge or side of a light guide or similar guiding structure (e.g., a hollow guiding cavity). The edge-coupled light source is configured to illuminate the guiding structure to provide light within the edge-lit backlight. The edge-coupled light source may include, but is not limited to, a CCFL or an LED, for example. The guiding structure may be configured to guide light from the edge-coupled light source using total internal reflection (TIR), a mirrored surface (e.g., a mirrored back surface), or a combination thereof, according to various examples. Further, in some examples, the guiding structure of the edge-lit backlight employed in the broad-angle backlight 310 may have a substantially rectangular cross section with parallel opposing surfaces (e.g., top and bottom surfaces). In other examples, the guiding structure may have a tapered or wedge-shaped cross section (i.e., the guiding structure may be 'wedge-shaped') with a first surface that is substantially non-parallel to a second, opposing surface.

The edge-lit backlight employed as the broad-angle backlight 310 may further include an extraction feature (not illustrated in FIGS. 7A-7B). The extraction feature is configured to extract light from the guiding structure and redirect the extracted light in a direction away from the guiding structure. For example, the extraction feature may extract light and direct the extracted light as the broad-angle emitted light 302, 302' away from the planar light-emitting surface 310' of the edge-lit backlight. Extraction features may include, but are not limited to, various micro-prismatic films or layers adjacent to a surface (e.g., a top surface) of the guiding structure, or various scatters or reflectors located either within the guiding structure itself or adjacent to one or both of a pair of opposing surfaces thereof.

Figure 8:
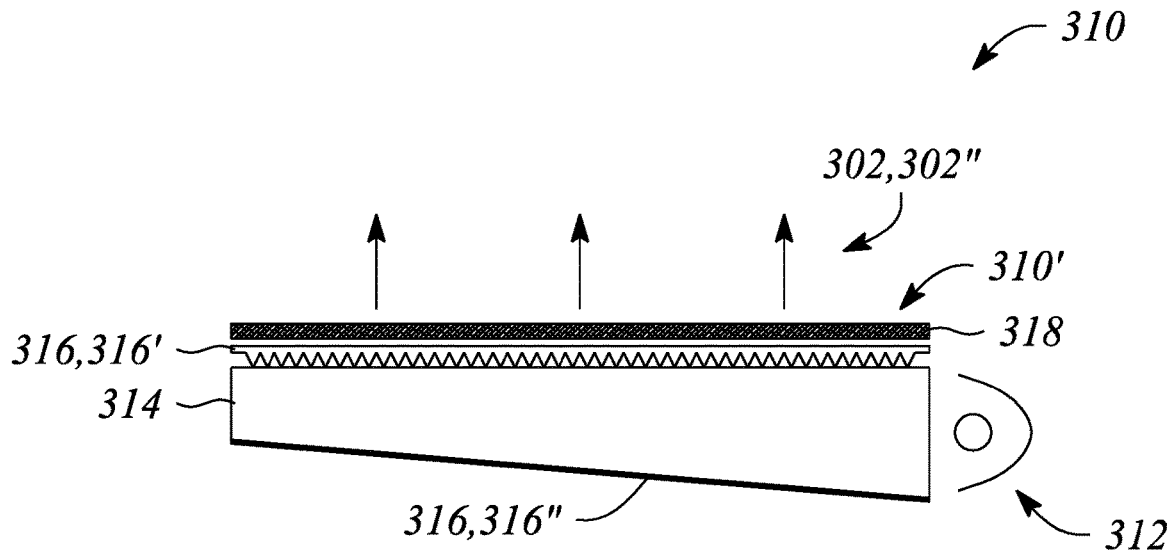
FIG. 8 illustrates a cross sectional view of a broad-angle backlight in an example, according to an embodiment consistent with the principles described herein.

FIG. 8 illustrates a cross sectional view of a broad-angle backlight 310 in an example, according to an embodiment consistent with the principles described herein. In particular, the broad-angle backlight 310 illustrated in FIG. 8 represents an example of an indirect or edge-lit backlight. As illustrated in FIG. 8, the broad-angle backlight 310 comprises a light source 312 coupled to an edge of the broad-angle backlight 310. The edge-coupled light source 312 is configured to produce light within the broad-angle backlight 310. Further, as illustrated by way of example and not limitation, the broad-angle backlight 310 illustrated in FIG. 8 comprises a wedge-shaped guiding structure 314 having extraction features 316. The illustrated extraction features 316 include a micro-prism layer 316' adjacent to the planar light-emitting surface 310' (i.e., top surface) and a reflective layer 316" on a surface (i.e., a back surface) of the guiding structure 314 opposite to the planar light-emitting surface 310'. The light from the edge-coupled light source 312 guided within the guiding structure 314 is redirected, scattered out of or otherwise extracted from the guiding structure 314 by the extraction features 316 to provide the broad-angle emitted light 302, 302', according to various embodiments.

In some embodiments, the broad-angle backlight 310, whether direct-emitting or edge-lit (e.g., as illustrated in FIG. 8), may further have one or more additional layers or films including, but not limited to, a brightness enhancement film (BEF), a diffuser or diffusion layer, and a turning film or layer. For example, a diffuser may be configured to provide the broad-angle emitted light 302, 302' as substantially diffuse light. FIG. 8 illustrates the broad-angle backlight 310 further comprising a diffuser 318 adjacent to the planar light-emitting surface 310' and configured to provide diffuse broad-angle emitted light 302, 302'. According to various embodiments (not illustrated in FIG. 8), other layers or films of the broad-angle backlight 310 (e.g., BEF, turning layer, etc.) may also be adjacent to the planar light-emitting surface 310'.

Referring again to FIGS. 7A-7B, the dual-mode privacy display system 300 further comprises a diffraction grating-based backlight 320. The diffraction grating-based backlight 320 is configured to provide and to direct into the viewbox 308 diffractively coupled-out light in or during the privacy mode of operation of the dual-mode privacy display system 300. In particular, the diffraction grating-based backlight 320 is configured to provide the diffractively coupled-out light as directional emitted light 302, 302" during the privacy mode (e.g., for use in providing the private image). Moreover, when provided in the privacy mode, the directional emitted light 302, 302" is directed toward the viewbox 308 that is spaced from the dual-mode privacy display system 300. Moreover, the directional emitted light 302, 302" is substantially confined to the viewing cone 306 between the dual-mode privacy display system 300 and the viewbox 308, e.g., as illustrated in FIG. 7B.

According to various embodiments, the diffraction grating-based backlight 320 is substantially transparent to the broad-angle emitted light 302, 302'. In particular, the broad-angle emitted light 302, 302' may readily pass through the diffraction grating-based backlight 320 in or during the public mode of operation of the dual-mode privacy display system 300, according to various embodiments, e.g., as illustrated in FIG. 7A.

In some embodiments, the diffraction grating-based backlight 320 may be substantially similar to a combination of the light guide and the diffraction grating of the privacy display 100, described above. In particular, as illustrated in FIGS. 7A-7B, the diffraction grating-based backlight 320 may comprise a light guide 322 configured to guide light. The light guide 322 may be substantially similar to the light guide 110 of the privacy display 100. For example, the light guide 322 may comprise a slab of optically transparent material configured to guide light by total internal reflection. Further, the light may be introduced into and guided within the light guide 322 at a non-zero propagation angle and according to a collimation factor σ. In various embodiments, the light guided within the light guide 322 may be provide by a light source (not illustrated) and introduced or coupled into the light guide 322 at a light-entrance edge of the light guide 322.

As illustrated in FIGS. 7A-7B, the diffraction grating-based backlight 320 may further comprise a diffraction grating 324. The diffraction grating 324 may be located at a surface of the light guide 322, as illustrated in FIG. 7A-7B. The diffraction grating 324 is configured to diffractively couple out a portion of the guided light from the light guide 322 as the diffractively coupled-out light. Further, the diffraction grating 324 is configured to direct the diffractively coupled-out light into the viewbox 308, i.e., the directed, diffractively coupled-out light is the directional emitted light 302, 302" of the diffraction grating-based backlight 320. In some embodiments, the diffraction grating 324 may be substantially similar to the diffraction grating 120, described above with respect to the privacy display 100.

For example, the diffraction grating 324 may comprise diffractive features having a feature spacing between adjacent diffractive features that decreases with increasing distance from the light-entrance edge, according to some embodiments. In addition, an extent of the viewbox 308 may be determined by the collimation factor σ of the guided light within the light guide 322, for example. Moreover, the viewbox extent may be selectable or adjustable by selecting or adjusting the collimation factor σ, according to some embodiments. In some embodiments, the diffraction grating 324 may comprise a plurality of curved diffractive features (e.g., hyperbolic or semicircular curved diffractive features) configured to direct the diffractively coupled-out light in two orthogonal directions to provide the viewbox 308 as a two-dimensional viewbox 308 having a two-dimensional viewing cone 306. In some embodiments, the diffraction grating 324 may comprise a plurality of sub-gratings (not illustrated) separated from one another by spaces. The plurality of sub-gratings may be configured to cooperatively direct the diffractively coupled-out light into the viewbox 308, for example. In some embodiments, the viewbox cone angle may be a negative cone angle.

According to various embodiments (e.g., as illustrated in FIGS. 7A-7B), the dual-mode privacy display system 300 further comprises a light valve array 330. The light valve array 330 is configured to modulate the broad-angle emitted light 302, 302' to provide the public image in the public mode. Further, the light valve array 330 is configured to modulate the diffractively coupled-out light (i.e., the directional emitted light 302, 302") to provide the private image in the privacy mode. As noted above, the provided private image is configured to be exclusively visible within the viewing cone 306 of the viewbox 308. Also, as noted above, the public image is configured to be visible both inside and outside the viewing cone 306 of the viewbox 308. According to some embodiments, the light valve array 330 may be substantially similar to the light valve array 130, described above with respect to privacy display 100. For example, the dual-mode privacy display system 300 may represent or be substantially similar to a combination of the privacy display 100 and the broad-angle backlight 310, in some embodiments.

According to some embodiments, the dual-mode privacy display system 300 may further comprise a light-blocking layer 340 between the broad-angle backlight 310 and the diffraction grating-based backlight 320. The light-blocking layer 340 is configured to selectively block light emitted from the diffraction grating-based backlight 320 from entering the broad-angle backlight 310, according to some embodiments. In particular, the light-blocking layer 340 is configured to block light emitted from the diffraction grating-based backlight 320 generally toward the broad-angle backlight 310. On the other hand, the light-blocking layer 340 is configured to transmit light emitted from the broad-angle backlight 310 generally toward the diffraction grating-based backlight 320. As such, the light-blocking layer 340 may represent a unidirectional light-blocking layer 340, according to some embodiments.

In other embodiments, the light-blocking layer 340 may be configured to selectively block light from passing through the light-blocking layer 340 and reaching the diffraction grating-based backlight 320, e.g., from the broad-angle backlight 310. In these embodiments, the light-blocking layer 340 may block the light only during specific modes of the dual-mode privacy display system 300. The light-blocking layer 340 configured to block light is illustrated using cross-hatching in FIG. 7B, while absence of the cross-hatching in FIG. 7A illustrates the light-blocking layer 340 being configured to transmit light (e.g., broad-angle emitted light 302, 302' from the broad-angle backlight 310).

According to some embodiments, the light-blocking layer 340 may be configured to provide either passive light blocking or active (e.g., switched) light blocking. For example, the light-blocking layer 340 may be a substantially passive layer that provides direction-selective light blocking. Examples of a passive layer that may be employed as the light-blocking layer 340 include, but are not limited to, a so-called unidirectional perfect absorber, a polarizer or polarization layer, or an angular filter. Other examples of a passive layer may include a multi-band filter (e.g., multi-band color filter) configured to selectively block (e.g., reflect, absorb, etc.) particular wavelengths of light produced by the diffraction grating-based backlight 320 while allowing different wavelengths of light produced by the broad-angle backlight 310 to pass, for example.

In another example, the light-blocking layer 340 may be an active layer configured to block light transmission in a light-blocking mode or condition and to transmit light in a light-transmitting mode or condition. The active light-blocking layer 340 may be selectively switched into the light-blocking condition to prevent light from being transmitted toward and into the broad-angle backlight 310 when the diffraction grating-based backlight 320 is active. The diffraction grating-based backlight 320 is active in the privacy mode of the dual-mode privacy display system 300 to provide the directional emitted light 302, 302", as illustrated in FIG. 7B for example. Moreover, the active light-blocking layer 340 may be selectively switched into the light-transmitting condition, when the broad-angle backlight 310 is active, to allow light to propagate out of the activated broad-angle backlight 310 and through the diffraction grating-based backlight 320 as the broad-angle emitted light 302, 302', e.g., as illustrated in FIG. 7A. The broad-angle backlight 310 is active when the dual-mode privacy display system 300 is in the public mode, for example.

Examples of active light-blocking layers 340 include, but are not limited to, a light valve (e.g., liquid crystal light valve) or a similar switchable absorption layer. Other examples include various other so-called 'active' shutter configurations based on electromechanical structures (e.g., microelectromechanical or MEMS mirrors, etc.), electroabsorption (e.g., semiconductor-based), or various non-linear crystals or organic polymers.

Figure 9:
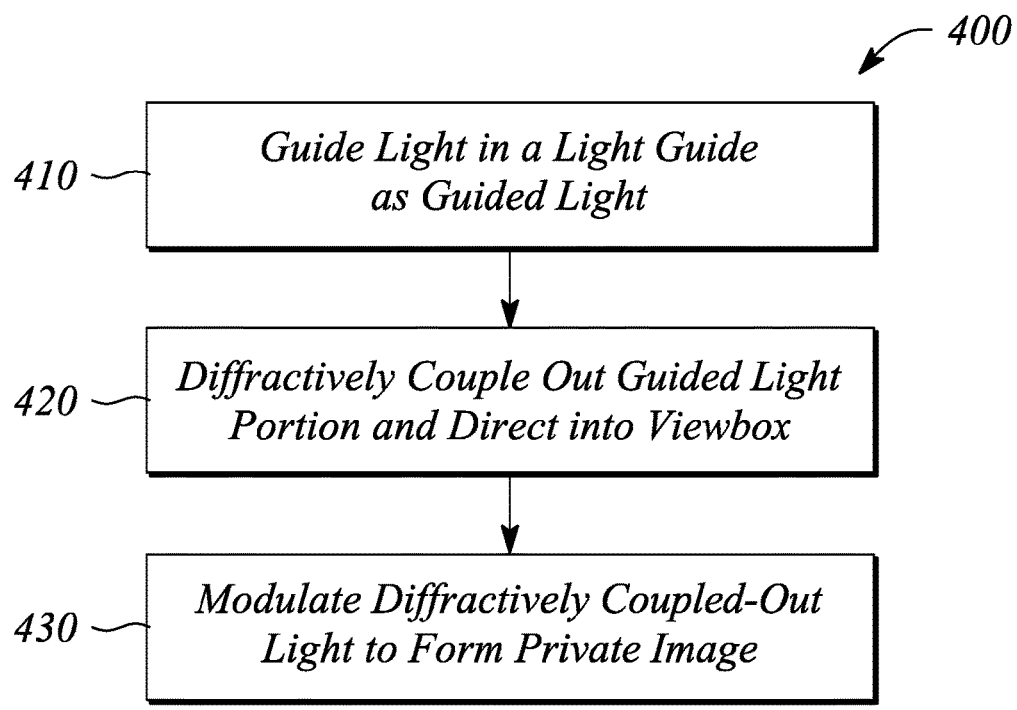
FIG. 9 illustrates a flow chart of a method of privacy display operation in an example, according to an embodiment consistent with the principles described herein.

In accordance with other embodiments of the principles described herein, a method of privacy display operation is provided. FIG. 9 illustrates a flow chart of a method 400 of privacy display operation in an example, according to an embodiment consistent with the principles described herein. As illustrated in FIG. 9, the method 400 of privacy display operation comprises guiding 410 light in a light guide as guided light. In some embodiments, the guided light may be guided 410 along a length of the light guide. For example, the light may be guided in a longitudinal direction. Further, the light is guided 410 according to a collimation factor. According to some embodiments, the light guide may be substantially similar to the light guide 110 described above with respect to the privacy display 100. For example, the light guide may be a plate light guide comprising a slab of optically transparent material that is configured to guide 410 light using total internal reflection. Further, the guided light may have a predetermined collimation factor that is substantially similar to the collimation factor σ, described above with respect to the light guide 110. Also, the guided light may be guided at a non-zero propagation angle.

As illustrated in FIG. 9, the method 400 of privacy display operation further comprises diffractively coupling out 420 a portion of the guided light and directing the diffractively coupled-out light into a viewbox. According to various embodiments, diffractively coupling out 420 the guided light portion uses a diffraction grating optically coupled to the light guide. The diffraction grating used in diffractively coupling out 420 the guided light portion may be located at a surface of the light guide, in some embodiments. Further, the viewbox into which the light is directed by diffractively coupling out 420 may be located spaced from and adjacent to the light guide surface. The diffraction grating used in diffractively coupling out 420 the guided light portion may be substantially similar to the diffraction grating 120 of the privacy display 100, described above. In particular, the diffraction grating may be a chirped diffraction grating comprising diffractive features having a feature spacing that decreases with increasing distance from a light-entrance edge of the light guide. Further, the diffraction grating may comprise curved diffractive features. The curved diffractive features may be configured to direct the diffractively coupled-out light in two orthogonal directions to provide a two-dimensional (2D) viewbox, for example, which has an extent determined by the collimation factor of the guided light. Further, in some embodiments, the viewbox may be substantially similar to the viewbox 108 having a viewing cone 106, described above.

The method 400 of privacy display operation illustrated in FIG. 9 further comprises modulating 430 the diffractively coupled-out light to form a private image within the viewbox. In addition, the private image may be exclusively visible within a viewing cone of the viewbox to provide viewing privacy, according to various embodiments. According to various embodiments, modulating 430 the diffractively coupled-out light uses a light valve array located between the light guide and the viewbox. According to some embodiments, the light valve array may be substantially similar to the light valve array 130 described above with respect to the privacy display 100. For example, the light valve array may comprise a plurality of liquid crystal light valves.

In some embodiments (not illustrated in FIG. 9), the method of privacy display operation may further comprise optically coupling light into the light guide at the light-entrance edge as the guided light, for example, using a light source. In some embodiment, the light source may be substantially similar to the light source 140 of the privacy display 100, described above. In particular, according to some embodiments, optically coupling light into the light guide may comprise providing the guided light with a predetermined collimation factor, as described above.

In some embodiments (not illustrated), the method of privacy display operation may further comprise providing broad-angle light using a broad-angle backlight and modulating the provided broad-angle light to form a pubic image. The public image may be visible both inside and outside the viewing cone of the viewbox, according to various embodiments. Further, the public image may be formed during a pubic mode and the private image may be formed during a privacy mode. As such, the method of privacy display operation that includes forming both the public image and the private image may be a method of dual-mode privacy display system operation, in some embodiments. In particular, the broad-angle backlight used to provide broad-angle light may be substantially similar to the broad-angle backlight 310 described above with respect to the dual-mode privacy display system 300, in some embodiments, and may further include a light-blocking layer that is substantially similar to the light-blocking layer 340 between the broad-angle backlight 310 and the diffraction grating-based backlight 320, also described above.

Thus, there have been described examples and embodiments of a privacy display, a dual-mode privacy display system and a method of privacy display operation that provide a private image in an viewbox and within a viewing cone. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A privacy display comprising:
   a light guide configured to guide light within the light guide as guided light having a predetermined collimation factor;
   a diffraction grating at a surface of the light guide, the diffraction grating being configured to diffractively couple out a portion of the guided light from the light guide as diffractively coupled-out light and to direct and concentrate the diffractively coupled-out light into a viewbox, the diffractively coupled-out light including principal light beams emitting from respective locations over an extent of the diffraction grating, the principal light beams having propagation angles that vary over the extent of the diffraction grating; and
   a light valve array configured to modulate the diffractively coupled-out light to provide a private image within the viewbox,
   the predetermined collimation factor of the guided light within the light guide being selected to determine an extent of the viewbox,
   the extent of the viewbox being less than an extent of the diffraction grating and an extent of the light valve array,
   the private image being configured to be exclusively visible within the viewbox.

2. The privacy display of claim 1, wherein the principal light beams are directed toward a middle of the viewbox.

3. The privacy display of claim 1, wherein the viewbox is a two-dimensional viewbox located in a plane parallel to the light guide surface, and wherein the diffraction grating comprises a plurality of curved diffractive features configured to direct and concentrate the diffractively coupled-out light in two orthogonal directions into the two-dimensional viewbox.

4. The privacy display of claim 3, wherein the plurality of curved diffractive features comprises one or both of concentric curved ridges and concentric curved grooves having a center of curvature.

5. The privacy display of claim 1, wherein the diffraction grating comprises diffractive features having a feature spacing between adjacent diffractive features that decreases as a function of distance from a light-entrance edge of the light guide.

6. The privacy display of claim 1, wherein a viewing cone of the viewbox has a negative cone angle.

7. The privacy display of claim 1, wherein the diffraction grating comprises a plurality of sub-gratings, the sub-gratings of the plurality being spaced apart from one another on the light guide surface and configured to cooperatively direct and concentrate the diffractively coupled-out light into the viewbox.

8. A dual-mode privacy display system comprising the privacy display of claim 1, the dual-mode privacy display system further comprising a broad-angle backlight configured to provide broad-angle light, the light guide being between the broad-angle backlight and the light valve array,
   wherein the light guide is configured to pass the broad-angle light through the light guide from a bottom surface to a top surface and the light valve array is further configured to modulate the broad-angle light that passes through the light guide, the dual-mode privacy display system having a privacy mode configured to provide the private image using the diffractively coupled-out light modulated by the light valve array and a public mode configured to provide a public image using the broad-angle light modulated by the light valve array, the public image being visible both inside and outside the viewbox.

9. A dual-mode privacy display system comprising:
   a broad-angle backlight configured to provide broad-angle emitted light in a public mode of the dual-mode privacy display system;
   a diffraction grating-based backlight configured to provide diffractively coupled-out light as directional emitted light into a viewbox in a privacy mode of the dual-mode privacy display system, the diffractively coupled-out light including principal light beams emitting from respective locations over an extent of the diffraction grating-based backlight, the principal light beams having propagation angles that vary over the extent of the diffraction grating-based backlight; and
   a light valve array configured to modulate the broad-angle emitted light to provide a public image in the public mode and to modulate the directional emitted light to provide a private image in the privacy mode, the private image being exclusively visible within the viewbox and the public image being visible both inside and outside the viewbox,
   the diffraction grating-based backlight being separate from and located between the broad-angle backlight and the light valve array,
   the viewbox having an extent that is less than an extent of the broad-angle backlight, the extent of the diffraction grating-based backlight, and an extent of the light valve array.

10. The dual-mode privacy display system of claim 9, where the diffraction grating-based backlight comprises:
   a light guide configured to guide light as guided light having a predetermined collimation factor; and
   a diffraction grating at a surface of the light guide, the diffraction grating being configured to diffractively couple out a portion of the guided light from the light guide as the directional emitted light and to direct and concentrate the directional emitted light into the viewbox, wherein the predetermined collimation factor is selected to determine the extent of the viewbox at a viewing distance from the dual-mode privacy display system.

11. The dual-mode privacy display system of claim 10, wherein the diffraction grating comprises diffractive features having a feature spacing between adjacent diffractive features that decreases with increasing distance from a light-entrance edge of the light guide.

12. The dual-mode privacy display system of claim 10, wherein the diffraction grating comprises a plurality of curved diffractive features configured to direct and concentrate the directional emitted light in two orthogonal directions to provide the viewbox as a two-dimensional viewbox located in a plane parallel to a surface of the light guide.

13. The dual-mode privacy display system of claim 10, further comprising a light source optically coupled to a light-entrance edge of the light guide, the light source being configured to inject light into the light guide to be guided within the light guide as the guided light having the predetermined collimation factor.

14. The dual-mode privacy display system of claim 10, wherein the diffraction grating comprises a plurality of sub-gratings spaced apart from one another on the light guide surface, the plurality of sub-gratings being configured to cooperatively direct and concentrate the diffractively coupled-out light into the viewbox.

15. The dual-mode privacy display system of claim 9, wherein a cone angle of a viewing cone is a negative cone angle.

16. A method of operation of a privacy display, the method further comprising:
    guiding light in a light guide as guided light having a predetermined collimation factor;
    diffractively coupling out a portion of the guided light as diffractively coupled-out light and directing the diffractively coupled-out light into a viewbox using a diffraction grating optically coupled to the light guide, the diffractively coupled-out light including principal light beams emitting from respective locations over an extent of the diffraction grating, the principal light beams having propagation angles that vary over the extent of the diffraction grating; and
    modulating the diffractively coupled-out light using a light valve array to form a private image within the viewbox,
    the predetermined collimation factor of the guided light being selected to determine an extent of the viewbox at a viewing distance from the privacy display,
    the extent of the viewbox being less than the extent of the diffraction grating and an extent of the light valve array,
    the private image being exclusively visible within the viewbox.

17. The method of operation of a privacy display of claim 16, wherein the diffraction grating comprises a plurality of curved diffractive features having a feature spacing that decreases with increasing distance from a light-entrance edge of the light guide.

18. The method of operation of a privacy display of claim 16, further comprising optically coupling light provided by a light source into the light guide at a light-entrance edge as the guided light, wherein optically coupling light provides collimated light having the predetermined collimation factor to be guided as the guided light.

19. The method of operation of a privacy display of claim 16, further comprising:
    providing broad-angle light using a broad-angle backlight that is separate and spaced apart from the light guide, the light guide being between the broad-angle backlight and the light valve array; and
    modulating the provided broad-angle light to form a public image, the public image being visible both inside and outside the viewbox,
    wherein the public image is formed during a public mode and the private image is formed during a privacy mode.

20. The method of operation of a privacy display of claim 16, wherein the diffraction grating comprises a plurality of sub-gratings, the sub-gratings of the plurality being spaced apart on a guiding surface of the light guide and configured to cooperatively concentrate the diffractively coupled-out light into the viewbox.

* * * * *